US008774822B2

(12) United States Patent
Sarkkinen et al.

(10) Patent No.: US 8,774,822 B2
(45) Date of Patent: Jul. 8, 2014

(54) TRANSMISSION OF DATA WITHIN A COMMUNICATIONS NETWORK

(75) Inventors: Sinikka Sarkkinen, Kangasala (FI); Woonhee Hwang, Espoo (FI)

(73) Assignee: Core Wireless Licensing S.a.r.l., Luxembourg (LU)

( * ) Notice: Subject to any disclaimer, the term of this patent is extended or adjusted under 35 U.S.C. 154(b) by 0 days.

(21) Appl. No.: 13/601,444

(22) Filed: Aug. 31, 2012

(65) Prior Publication Data

US 2012/0320867 A1 Dec. 20, 2012

Related U.S. Application Data

(62) Division of application No. 10/491,359, filed as application No. PCT/EP01/09657 on Aug. 21, 2001, now Pat. No. 8,280,424.

(51) Int. Cl.
*H04W 88/02* (2009.01)
(52) U.S. Cl.
USPC ...................................... 455/452.2
(58) Field of Classification Search
CPC ..... H04W 28/04; H04W 36/18; H04W 56/00; H04W 72/08; H04W 84/042; H04W 28/14; H04W 36/00; H04W 36/02; H04W 36/24; H04W 72/1231; H04W 72/1278; H04W 76/04; H04W 76/064; H04W 92/12; H04L 1/1812; H04L 1/1887; H04L 1/1835; H04L 2001/0093; H04L 5/023; H04L 12/2602; H04L 1/0033; H04L 1/16; H04L 1/1845; H04L 1/1848; H04L 1/1867; H04L 43/00
USPC ............... 455/452.2, 63.1, 512–513; 370/232
See application file for complete search history.

(56) References Cited

U.S. PATENT DOCUMENTS

| 6,442,149 | B1 | 8/2002 | Nakano et al. |
| 6,490,264 | B1 | 12/2002 | Suzuki |
| 6,934,275 | B1 | 8/2005 | Love et al. |
| 7,209,456 | B2 | 4/2007 | Kwak et al. |
| 7,286,563 | B2 | 10/2007 | Chang et al. |
| 7,460,877 | B2 | 12/2008 | Terry et al. |
| 8,280,424 | B2 * | 10/2012 | Sarkkinen et al. ............ 455/522 |

(Continued)

FOREIGN PATENT DOCUMENTS

| EP | 0 662 778 A2 | 12/1995 |
| JP | 07245628 A | 9/1995 |

(Continued)

OTHER PUBLICATIONS

3GPP TR 25.855 V1.0.0 (Jun. 2001); Technical Specification Group Radio Access Network; High Speed Downlink Packet Access; Overall UTRAN Description (Release 5); Jun. 2001; 26 pages.

(Continued)

*Primary Examiner* — Diane Mizrahi
(74) *Attorney, Agent, or Firm* — Terrile, Cannatti, Chambers & Holland, LLP; Stephen A. Terrile

(57) ABSTRACT

Transmission of control parameters from a controller of a communications network via an interface to a network element of the network, in order to enable the network element to configure high speed downlink packet access, is enable by an interference application protocol which allows the controller to add the control parameters to control messages transmitted from the controller to the network element via the interference.

23 Claims, 18 Drawing Sheets

(56) References Cited

U.S. PATENT DOCUMENTS

| | | | |
|---|---|---|---|
| 2002/0094833 A1* | 7/2002 | Lieshout et al. | 455/522 |
| 2004/0039979 A1* | 2/2004 | Garani | 714/752 |
| 2005/0207359 A1* | 9/2005 | Hwang et al. | 370/278 |
| 2011/0090872 A1* | 4/2011 | Dahl n et al. | 370/332 |
| 2012/0149362 A1* | 6/2012 | Tooher et al. | 455/423 |

FOREIGN PATENT DOCUMENTS

| | | |
|---|---|---|
| JP | 2000-22707 A | 1/2000 |
| JP | 2003111147 A | 4/2003 |
| WO | 97/17779 A1 | 5/1997 |

OTHER PUBLICATIONS

3GPP TS 25.323 V3.0.0 (Dec. 1999); Technical Specification Group Radio Access Network; Packet Data Convergence Protocol (PDCP) Specification; Dec. 1999; 16 pages.
3GPP TS 25.433 V3.4.1 (Dec. 2000); Technical Specification Group Radio Access Network; UTRAN Iub Interface NBAP Signalling (Release 1999); Dec. 2000; 431 pages.
3GPP TS 25.435 V3.5.0 (Dec. 2000); Technical Specification Group Radio Access Network; UTRAN Iub Interface User Plane Protocols for Common Transport Channel Data Streams (Release 1999); Dec. 2000; 34 pages.
3GPP TS 25.301 V3.6.0 (Sep. 2000); Technical Specification Group Radio Access Network; Radio Interface Protocol Architecture (Release 1999); Sep. 2000; 44 pages.
3GPP TS 25.435 V4.1.0 (Jun. 2001); Technical Specification Group Radio Access Network; UTRAN Iub Interface User Plane Protocols for Common Transport Channel Data Streams (Release 4); Jun. 2001; 35 pages.
3GPP TS 25.425 V4.0.0 (Mar. 2001); Technical Specification Group Radio Access Network; UTRAN Iur Interface User Plane Protocols for Common Transport Channel Data Streams (Release 4); Mar. 2001; 24 pages.
3GPP TS 25.433 V4.1.0 (Jun. 2001); Technical Specification Group Radio Access Network; UTRAN Iub Interface NBAP Signalling (Release 4); Jun. 2001; 563 pages.
Patent Abstracts of Japan, Publication No. 2000022707A, published Jan. 21, 2000; English Abstract, 1 page.
TSG-RAN WG2 #22; Berlin, Germany, Jul. 9-13, 2011; R2-011631; Agenda item: 9.2.1; Source: Nokia; Title: Multiplexing and channel coding for HSDPA; Document for: Discussion and Decision, 7 pages.
TSG-RAN Working Group 3 Meeting #21; R3-01-012473; Helsinki, Finland, Aug. 2t-31, 2001; Agenda Item: RAN2/RAN3 ad-hoc; Source: Ericsson; Title: HSDPA UTRAN protocol model; Document for: Discussion and approval, 3 pages.
TSG-RAN Working Group 3 Meeting #23; R3-012291; Helsinki, Finland, Aug. 27-31, 2001; Agenda Item: rb-5.3; Source: Nokia; Title: Transport layer on Iub for HSDPA; Document for: Discussion, 5 pages.
TSG-RAN Working Group 3 Meeting #27; R3-020891; Agenda Item: rb-5.3; Source: Rapporteur; Title: Draft TR 25.877 v1.0.0: "High Speed Downlink Packet Access: Iub/Iur protocol aspects"; Document for: Approval, 52 pages.
Patent Abstracts of Japan, Publication No. 2003111147A, published Apr. 4, 2003; English Abstract, 1 page.
Patent Abstracts of Japan, Publication No. 07245628A, published Sep. 9, 1995; English Abstract, 1 page.
TSG-RAN Working Group 3 Meeting #23; R3-012306 (TSGR3#17(01)2306); Helsinki, Finland, Aug. 27-31, 2001; Agenda Item: rb-5.3; Source: Motorola; Title: HSDPA Changes to the Iub UP Protocol; Document for: Approval, 8 pages.

* cited by examiner

| IE/Group Name | Presence | Range | IE Type and Reference | Semantic Description | Criticality | Assigned Criticality |
|---|---|---|---|---|---|---|
| HS_DSCH Information | | | | | | |
| >MCS Sets | | | | | | |
| >HS_DSCH Power Level | | | | | | |
| >NumOf Codes | | | | | | |
| >TTI Selection | | | | | | |
| >HARQ Information | | | | | | |
| >>NumOfChannel | | | | | | |
| >>MaxAttempt | | | | | | |
| >>Redundancy Ver Domain | | | | | | |

FIG. 14

| IE/Group Name | Presence | Range | IE type and reference | Semantics description |
|---|---|---|---|---|
| HS_DSCH ID | | | | |

FIG. 15

| IE/Group Name | Presence | Range | IE type and reference | Semantics descriptions | Criticality | Assigned Criticality |
|---|---|---|---|---|---|---|
| HS_DSCH Information Response | | | | | | |
| >HS_DSCH ID | M | 1 to <Numof HSDSCH> | | | — | |
| >Binding ID | O | | | | — | |
| >Transport Layer Address | O | | | | — | |

| Range bound | Explanation |
|---|---|
| MaxnooHSDSCHs | Maximum number of HS_DSCHs for one UE. |

FIG. 16

| IE/Group Name | Presence | Range | IE type and reference | Semantics descriptions | Criticality | Assigned Criticality |
|---|---|---|---|---|---|---|
| HS_DSCH FDD Information | | | | | | |
| >HS_DSCH ID | | 1 to <maxnoof HSDSCHs> | | | | |
| >UE ID | | | | | -- | |
| >Transport Format Set | | | | | | |
| >Allocation/Retention Priority | | | | | | |
| >Frame Handling Priority | | | | | -- | |
| >ToAWS | | | | | -- | |
| >ToAWE | | | | | -- | |
| >NumOfCodes | | | | | | |
| >BufferStatus | | | | | -- | |
| >HARQ Capacity | | | | | -- | |
| >>NumOfChannel | | | | | | |
| >>MaxAttempt | | | | | | |
| >>RedundancyVer | | | | | | |

| Range bound | Explanation |
|---|---|
| MaxnoofHSDSCHs | Maximum number of HS-DSCHs for one UE. |

FIG. 17

| IE/Group Name | Presence | Range | IE type and reference | Semantics description |
|---|---|---|---|---|
| Dynamic Transport Format Information | | 1 to <maxTFcount> | | The first instance of the parameter corresponds to TFI zero, the second to 1 and so on. |
| >Number of Transport blocks | M | | INTEGER (0..512) | |
| >Transport Block Size | C – Blocks | | INTEGER (0..5000) | Bits |
| >CHOICE mode | M | | | |
| >>TDD | | | | |
| >>>Transmission Time interval Information | C-TTIdynamic | 1 to <maxTTIcount> | | |
| >>>>Transmission time interval | M | | Enumerated(10, 20, 40, 80,...) | ms |
| Semi-static Transport Format Information | | 1 | | |
| >Transmission time interval | M | | ENUMERATED (10, 20, 40, 80, dynamic,...,5, 1slot, 3slot, 5slot, 15slot) | ms; Value "dynamic" for TDD only; Value "5" for LCR TDD only; "1slot", "3slot", "5slot" and "15slot" for HS-DSCH only and no other values are applicable to HS-DSCH |
| >Type of channel coding | M | | ENUMERATED (No coding, Convolutional, Turbo,...) | In case HS-DSCH, "Convolutional" shall not be used |
| >Coding Rate | C – Coding | | ENUMERATED (1/2, 1/3,...) | |
| >Rate matching attribute | M | | INTEGER (1..maxRM) | |
| >CRC size | M | | ENUMERATED (0, 8, 12, 16, 24,...) | |
| >CHOICE mode | M | | | |
| >>TDD | | | | |
| >>>2nd interleaving mode | M | | Enumerated (Frame related, Timeslot related,...) | |

FIG. 18

TRANSMISSION OF DATA WITHIN A COMMUNICATIONS NETWORK

CROSS REFERENCE TO RELATED APPLICATIONS

This application is a divisional of application Ser. No. 10/491,359, filed Oct. 18, 2004, now U.S. Pat. No. 8,280,424 which is the National Stage of International Application No. PCT/EP01/09657, filed Aug. 21, 2001.

FIELD OF THE INVENTION

The invention relates to methods for providing a network element, e.g. a Node B, of a communications network, e.g. a UTRAN (Universal mobile telecommunication services terrestrial radio access network) with data, e.g. HSDPA (High speed downlink packet access) related data, required at said network element. On the one hand, the invention relates more specifically to a method for transmitting within a communications network user data, e.g. HSDPA related user data, from a controller to a network element over an interface, e.g. an Iub interface. On the other hand, the invention relates more specifically to a method for providing a network element, e.g. a Node B, of a communications network, e.g. a UTRAN, with control parameters, e.g. HSDPA related control parameters, available at a controller of said communications network, e.g. an RNC, which controller is connected to said network element via an interface, e.g. an Iub interface. The invention equally relates to corresponding communications networks, network elements and controllers.

BACKGROUND OF THE INVENTION

HSDPA is a concept that was introduced for UTRAN architectures as an enhancement to the shared channel concept in 3GPP (3rd generation partnership project).

In UMTS, the UTRAN handles all radio-related functionality. To this end, a UTRAN comprises one or more RNCs, and connected to each RNC one or more Node Bs. The RNCs of the UTRAN are connected to a core network via an Iu interface. RNCs of one UTRAN may be interconnected in addition by an Iur interface. In downlink transmissions, an RNC receives user data from the core network, possibly via another RNC, and forwards it via an Iub interface to a Node B. The Node B then transmits the data to the addressed user equipment UE via a Uu interface.

The RNCs of a UTRAN might take different roles. A controlling RNC (CRNC) may be defined, for example, with respect to a specific set of Node Bs. There is only one CRNC for any Node B. The CRNC has an overall control over the logical resources of its Node Bs. A serving RNC (SRNC) may be defined with respect to a specific connection between an UE and a UTRAN. There is one SRNC for each UE that has a connection to UTRAN. The SRNC is in charge of the radio resource control (RRC) connection between a UE and the UTRAN. The Serving RNC also terminates the Iu for this UE.

In the shared channel concept in UTRAN for FDD mode, a DSCH (downlink shared channel) is defined as a downlink transport channel which is shared dynamically between several UEs. The DSCH is assembled in a CRNC and transmitted via a Node B to a UE, as described for instance in the technical specification 3GPP TS 25.301 V3.6.0 (2000-09): "3rd Generation Partnership Project; Technical Specification Group Radio Access Network; Radio Interface Protocol Architecture (Release 1999)".

The basic idea of HSDPA is to offer for downlink transmissions shared high speed channels with a higher data rate and a quicker retransmission mechanism already from Node B. The shared high speed channels are to comprise a HS-DSCH (high speed downlink shared channel) as transport channel and a DPCH (dedicated physical channel), combined with a separate shared physical control channel in combination with a HS-PDSCH (high speed physical downlink shared channel). The fast retransmission mechanism to be implemented in the Node B is HARQ (hybrid automatic repeat request).

The currently used DSCH may also support high data rates, but retransmission is always provided by a RLC (radio link control) layer in the RNC, which slows the transaction down.

In order to support the new capabilities, especially HARQ, a new MAC (medium access control) entity was introduced in the technical report 3GPP TR 25.855 V1.0.0 (2001-06): "3rd Generation Partnership Project; Technical Specification Group Radio Access Network; High Speed Downlink Packet Access; Overall UTRAN Description (Release 5)", which is incorporated by reference herein. The new MAC entity is called MAC-hs and is always located in the Node B. In the preceding releases of 3GPP, all UTRAN MAC entities capable of also handling user plane data were always located exclusively in the RNCs. The MAC-hs exists only when the cell is configured to support the HSDPA concept, and it is connected to a MAC-c/sh located in an RNC through the Iub interface.

A MAC layer is used for mapping logical channels to transport channels. A logical channel is a channel type which is defined between the radio link control (RLC) in an RNC and the MAC layer. Each logical channel defines what kind of data is going to be transmitted through it. In the case of HSDPA, the logical channels always locate in the SRNC. A transport channel is a channel type which is defined between the MAC layer and L1 (layer 1). It describes how data is to be transmitted through the radio link. In the DSCH concept, the transport channel is seen on the Iub interface, whereas in the HSDPA concept the transport channel is an internal channel in Node B.

The connection of different MACs of a UTRAN for HSDPA is illustrated in FIG. 1, which was taken from the above cited technical report TR 25.855.

FIG. 1 depicts a MAC-hs 1 located in a Node B, and in addition a MAC-c/sh 2 and a MAC-d 3 located in one or more RNCs. The MAC-hs 1 is connected to the MAC-c/sh 2 via the Iub interface, while the MAC-c/sh 2 is connected to the MAC-d 3 via an Iur interface in case they are located in different RNC, otherwise these MACs 2, 3 are interconnected locally. A MAC control has access to each of the MACs 1-3. Such logical channels as PCCH (Paging channel) and BCCH (broadcast control channel) are directly mapped to the MAC-c/sh 2 without intervening of MAC-d 3. However such logical channels as DCCH (Dedicated control channel) and DTCH (dedicated traffic channel) are always connected to MAC-d 3, which forwards the received data packets to the MAC-c/sh 2, if the UE has access rights either to the common channel(s) or to the shared channel(s). MAC-c/sh 2 and MAC-d 3 map different kinds of logical channels onto transport channels, like PCH (paging channel), FACH (forward access channel), DCH (dedicated channel) etc., for transmission to a UE via a Node B. Received HSDPA related data is provided by MAC-d 3 via MAC-c/sh 2 without mapping to the MAC-hs 1 of the Node B for transmission in HS DSCHs to a UE. For the details of FIG. 1 it is referred to the technical report TR 25.855.

Alternatively, the MAC-hs could be connected directly to a MAC-d.

Since functionalities previously implemented only in the RNCs have now to be provided also in Node Bs, like TFC (transport format combination) selection, the functional split between Node B and RNC has been reorganized. The new distribution of functionalities is shown in FIGS. 2 and 3, which were equally taken from technical report TR 25.855, and which presents in more detail some of the functions provided by MAC-c/sh 2 and MAC-hs 1 respectively.

Upon the reorganization, scheduling/priority handling and TFC selection functions have been removed from the MAC-c/sh 2 of the RNC in FIG. 2 for HSDPA related downlink transmissions and added to the MAC-hs 1 of the Node B in FIG. 3. Thus, the final scheduling and the real time traffic control is not under RNC control any more for HSDPA. Accordingly, in the MAC-c/sh 2 in FIG. 2, HSDPA related data received from a MAC-d are passed on to the MAC-hs 1 of FIG. 3 without any scheduling, priority handling or TFC selection etc. being performed as for other downlink data. Previously, these functions were always taken care of either in a SRNC when Node B was connected directly to an SRNC, or in a CRNC when the Node B was connected to an CRNC. In addition, HARQ is implemented in the new MAC-hs 1 of FIG. 3. For the details of FIGS. 2 and 3 it is referred to the above cited technical report TR 25.855.

The reorganization of functionalities implies that the known transmissions of downlink user data and of required control information from an RNC to a Node B has to be adapted.

For the transmission of downlink user data, it was proposed that the RLC layer is not changed. This means that the RLC buffers as before RLC PDUs (protocol data units) in RNC buffers, and that the RLC submits data to the lower layer only upon request of the MAC layer which locates on the RNC, i.e. MAC-d 3. Therefore the transactions to support data transmission between a MAC entity in an RNC and a MAC-hs 1 in a Node B are currently defined only on high level, but details are still missing. By these high level definitions, a flow control functionality is defined between MAC-c/sh 2 and MAC-hs 1 as a new feature, as indicated in FIG. 3, in order to control the data flow from the RNC to the Node B.

To support actual data transmissions on the Iub-interface, moreover a HS-DSCH Frame protocol layer (HS-DSCH FP) was included under the MAC-c/sh and above the MAC-hs. This layer is indicated in FIG. 4, which was again taken from technical report TR 25.855. FIG. 4 shows a radio interface protocol architecture of HSDPA, and more specifically layers of network elements which network elements are, from left to right, a user equipment UE connected via a Uu interface to a Node B, which is further connected via an Iub interface to a first RNC, which is finally connected via an Iur interface to a second RNC. Each of the Node B, the first and the second RNC comprises in addition to the respective MAC entity a HS-DSCH FP. This HS-DSCH FP is intended to transmit not only data packets from the RNC to the Node B, but also related control information. Such an FP protocol is proposed without any details for data transmissions in downlink on both, Iub and Iur interfaces, which transmissions are using the service of L2 (layer 2) of MAC and RLC. For the details of FIG. 4, it is referred to the above cited technical report TR 25.855.

None of the current FP frame structures defined for the Iub interface, however, is applicable for HSDPA. In particular the FP frame structure used for DSCHs, from which DSCHs the proposal for HSDPA proceeds, is not suited for HSDPA data transmissions, since a DSCH FP frame contains fields of which the values can only be defined when the scheduling or TFC selection has already been made. As mentioned above, these functions were shifted for HSDPA related transmissions to the Node B. Moreover, a DSCH FP frame does not contain all of the information which is required for HSDPA to support flow control between an RNC and a Node B.

In addition to HSDPA related user data, also control information has to be available at the Node B so that the Node B can set up and re-configure HS-DSCH channels for transmissions.

Due to the functional reorganization, the current application protocol procedures on Iub for DSCH setup and reconfiguration, described e.g. in the technical specification 3GPP TS 25.433 V3.4.1 (2000-12): "3rd Generation Partnership Project; Technical Specification Group Radio Access Network; UTRAN Iub Interface NBAP Signalling (Release 1999)", cannot be used for HS-DSCH. For example, in the case of HSDPA it is not necessary to provide channel coding parameters during a radio link (RL) setup as for DSCH, since these channel coding parameters are decided upon in the Node B. On the other hand, some parameters that are not required by a Node B for DSCH should be provided to a Node B for HSDPA during a cell setup procedure so the Node B can configure HS-DSCH attributes in a cell. It should moreover be possible to modify these parameters cell-based, preferably in a semi-static manner.

SUMMARY OF THE INVENTION

It is an object of the invention to enable the transmission of data within a communications network, which data is required at a network element of said communications network.

It is also an object of the invention to enable the use of HSDPA by an UTRAN, and more specifically to enable the RNC of an UTRAN to provide a Node B of the UTRAN with HSDPA related data.

It is in particular an object of the invention to enable an RNC to provide a Node B in a suitable way with HSDPA related user data and with HSDPA relevant control parameters on NBAP (Node B Application Part).

A first aspect of the invention is directed at the transmission user data, while a second aspect of the invention is directed at the transmission of control parameters.

For the first aspect of the invention, a method is proposed for transmitting user data within a communications network from a controller to a network element over an interface. The communications network can be in particular a UTRAN, the controller an RNC, the network element a Node B and the interface an Iub interface. The controller uses at least one dedicated frame structure, in particular a dedicated HSDPA FP frame structure, for assembling data frames with the user data. The data frames are then transmitted via the interface to the network element. The frame structure includes at least a header section for receiving information required in said network element for processing the user data.

For the first aspect of the invention, in addition a communications network, in particular a UTRAN, a controller, in particular an RNC, and a network element, in particular a Node B, are proposed which comprise means for realizing the proposed method.

Concerning the first aspect, the invention proceeds from the idea that the transmission of information required for the processing of HSDPA related user data should be similar to the solutions used for other shared channels, but still be optimized for the requirements of HSDPA. The proposed dedicated frame structure allows to remove all fields employed in the structures for DSCH which are no longer necessary for HSDPA, and to insert fields for the information required additionally for HSDPA. Thus, an optimized transmission of information required for HSDPA related user data via the Iub interface is enabled. The same considerations may apply for other communications networks, network elements and situations.

For the second aspect of the invention, a method is proposed for providing a network element of a communications network with control parameters available at a controller of the communications network, which controller is connected to said network element via an interface. The communications network can be in particular a UTRAN, the controller an RNC, the network element a Node B and the interface an Iub interface. The method comprises employing an interface application protocol which enables an insertion of at least one control parameter, in particular an HSDPA related control parameter, into at least one kind of control message transmitted from said controller to said network element over said interface.

Also for the second aspect of the invention, in addition a communications network, in particular a UTRAN, a controller, in particular an RNC, and a network element, in particular a Node B, are proposed which comprise means for realizing the proposed method.

Concerning the second aspect, the invention proceeds from the idea that the most efficient way to provide a Node B with control parameters required for setting up an re-configuring HS DSCH channels is to include the parameters in control messages transmitted from an RNC to the Node B. Since RNC and Node B are connected to each other via an Iub interface, it is thus proposed to modify the Iub application protocol accordingly. As a result, the Node B is for example able to setup and re-configure HS-DSCH channels based on received control parameters. The Node B can therefore be configured by the RNC to support HSDPA related data to user equipment in the cell. The same considerations may apply for other communications networks, network elements and situations.

Both aspects of the invention have in common that they comprise an HSDPA specific implementation of general specifications used for transmitting data from RNC to Node B via the Iub interface, i.e. on the one hand an implementation of dedicated frame structures and on the other hand an implementation of an Iub application protocol with HSDPA specific procedures.

Preferred embodiments of the invention become apparent from the subclaims.

In a preferred embodiment of the first aspect of the invention, the frame structure further includes a payload section for receiving at least one SDU to which HSDPA related user data was distributed by said controller, wherein the header section receives information required in the network element for processing HSDPA related user data. Thus, information required at Node B for processing HSDPA related user data can be transmitted in an advantageous way in a single frame together with said user data. The SDUs are in particular MAC-d SDUs and/or MAC-c/sh SDUs.

For the first aspect of the invention it is to be noted that the proposed HSDPA FP frame structure can be designed to receive any amount of information, which information can be predetermined arbitrarily according to the requirements.

Further, it should not be obligatory that the payload section contains any data in a frame assembled according to the dedicated frame structure so that the same structure may be used for transmitting information only in the header section, e.g. information for an HSDPA flow control.

In particular, different FP frame structures can be provided for the cases that MAC/FP UE-ID multiplexing is or is not allowed in the RNC. UE-ID multiplexing is a multiplexing type in which different UEs are multiplexed onto the same transport channel and can be performed either in the MAC layer or the FP layer of an RNC. In the case of FP UE-ID multiplexing, the header of the FP frame should always contain the UE-ID identification. This identification can be e.g. RNTI, or it can be a new identification defined for this purpose only and thus be shorter than the current RNTI. In a case of MAC UE-ID multiplexing, the UE-ID field is used in the MAC header, i.e. RNTI is added into MAC header, no identification is necessarily required in FP frame. The Node B can fetch the UE-ID information by reading the MAC header. Then again if it is wanted that the FP frame should contain the UE-ID field despite the addition of the RNTI into the MAC header, the used UE-ID can be e.g. RNTI, or it can be a new identification defined for this purpose only and thus be shorter than the current RNTI.

There are moreover different alternatives as to how multiplexing can be carried out, and the used multiplexing method may have to be considered when determining the most suitable structure of the FP frame. The kind of multiplexing used can in particular have an impact on the number of fields of the same kind provided in one FP frame. One alternative for multiplexing is time division base multiplexing, which means that one FP data frame can carry data, which belongs to one UE only. In another alternative it is possible to carry data belonging to different UEs in one FP frame. Further, multiplexing could be taken care of by allowing an FP entity to send only one FP frame within one TTI, and this frame could be devoted to only one UE or it could transmit data for a number of UEs. Multiplexing could also mean that an FP entity could send more than one FP frame within one TTI which all are assigned to one UE, or each FP frame could carry data which is meant for different UEs.

Equally, different FP frame structures can be provided for the cases that a user equipment identification has or has not to be transmitted from the RNC to the Node B.

The size of frames based on one predetermined frame structure can be made variable, by allowing for some information in the header section a dedicated field for each user equipment or for each RNC buffer from which data was taken etc. A field structure can moreover be generalized by making the insertion of some of the information optional.

Some information that is taken into account by a specific frame structure may be related to RNC buffers or buffering employed in HSDPA data transmission for buffering user data in an RNC. It is to be noted that the term RNC buffering or RNC buffers is used to indicate the buffering capability in the RNC without identifying the exact location of the buffer. Therefore, the buffering may be provided for instance on the RLC layer and/or on the MAC layer.

In the first aspect of the invention, some user equipment specific information can moreover be either included in the header section of the proposed frame structure, or in a header section of a respective SDU inserted in the payload section of the proposed frame structure.

In the second aspect of the invention, also the Iub application protocol can permit to include any suitable kind and number of parameters into any suitable kinds of message according to the requirements.

There are two classes of control parameters that might have to be provided from an RNC to a Node B according to the second aspect of the invention. Either the RNC decides on an exact value of a parameter and the Node B has to follow this decision, or the RNC provides a bound of possible choices. In the latter case, the Node B can decide on the value according to its own conditions within the provided bound. Thus, the content of each control parameter is either a fixed value, an indication of a range for the value, or a set of allowed values to be used by said Node B.

The control parameters of the second aspect of the invention can be in particular cell specific parameters required in the Node B e.g. for the setup and/or the reconfiguration of a cell, or a radio link specific parameter required in the Node B e.g. for the setup and/or the reconfiguration of a radio link. It can then be determined by the Iub application protocol that the parameters are to be included in control messages relating to a cell setup or reconfiguration or in a control message relating to an RL setup or reconfiguration respectively.

Both cell specific parameters and RL specific parameters can be provided either as specific value or as bound of choices.

In order to include the control parameters of the second aspect of the invention in a control message, preferably one or more information elements (IE) or group of IEs are defined. Each IE can then comprise a field for each parameter required for a specific situation. The IEs can be added to a control message which has to be transmitted in this specific situation. In addition, IEs defined for DSCH or corresponding IEs might be used, as far as the required parameters are the same for some situations. It is also possible to define sets of IEs and/or groups of IEs for specific situations which are to be added to some control message for the respective situation.

BRIEF DESCRIPTION OF THE FIGURES

In the following, the invention is explained in more detail with reference to drawings, of which

FIG. 14 is a table presenting a set of cell specific IEs for an embodiment of the second aspect of the invention;

FIG. 15 is a table presenting an RL cell specific IE for an embodiment of the second aspect of the invention;

FIG. 16 is a table presenting a first set of RL cell specific IEs for an embodiment of the second aspect of the invention;

FIG. 17 is a table presenting a second set of RL cell specific IEs for an embodiment of the second aspect of the invention; and FIG. 18 is a table illustrating a modification of a known TFS for an embodiment of the second aspect of the invention.

DETAILED DESCRIPTION OF THE INVENTION

First, three embodiments of an HSDPA FP frame structure according to the first aspect of the invention will be presented.

The respective frame structures are to be used for transmitting HSDPA related user data within a UTRAN from a MAC-c/sh of an RNC via a Iub interface to a MAC-hs of a Node B. A UE to which the user data is addressed is connected to this Node B.

When determining a suitable frame structure, the requirements and capabilities of the network elements, i.e. RNC and Node B, should be considered. One factor that should be considered for example is MAC/FP UE-ID multiplexing which can be allowed in the RNC or not, as will be explained in the following.

Figure 1:
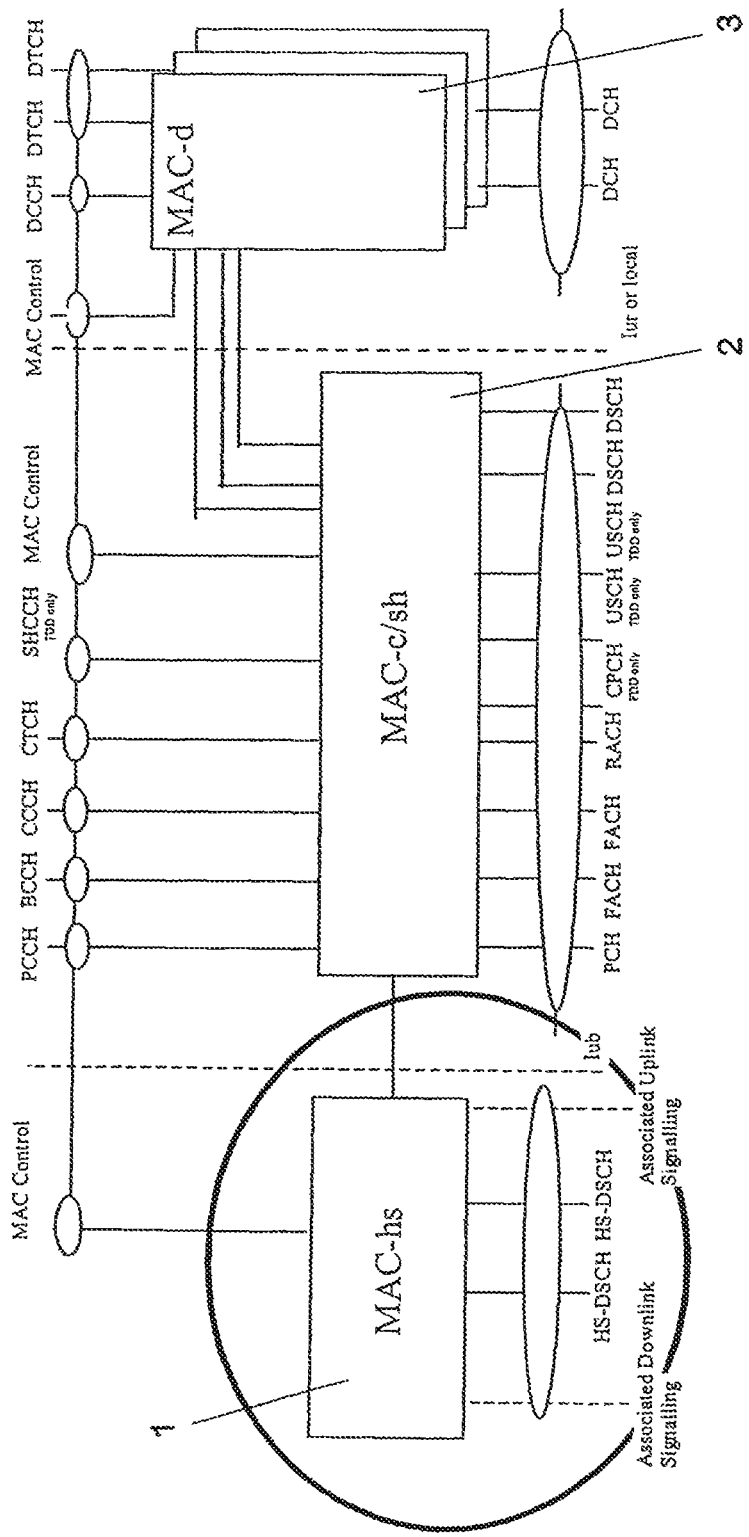
FIG. 1 shows a known UTRAN-side overall MAC architecture defined for HSDPA.
Figure 2:
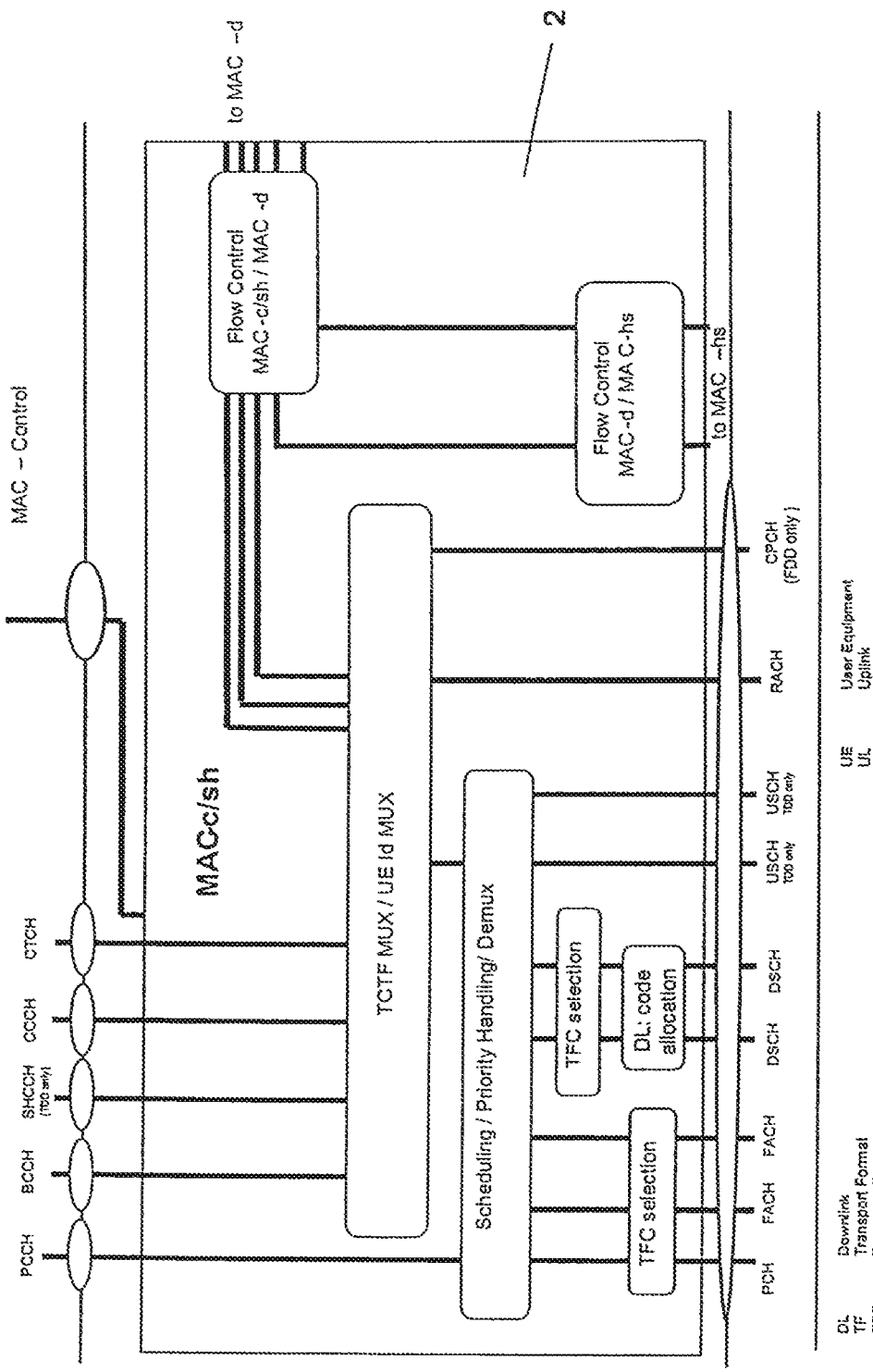
FIG. 2 shows details of a known MAC-c/sh of an RNC.
Figure 3:
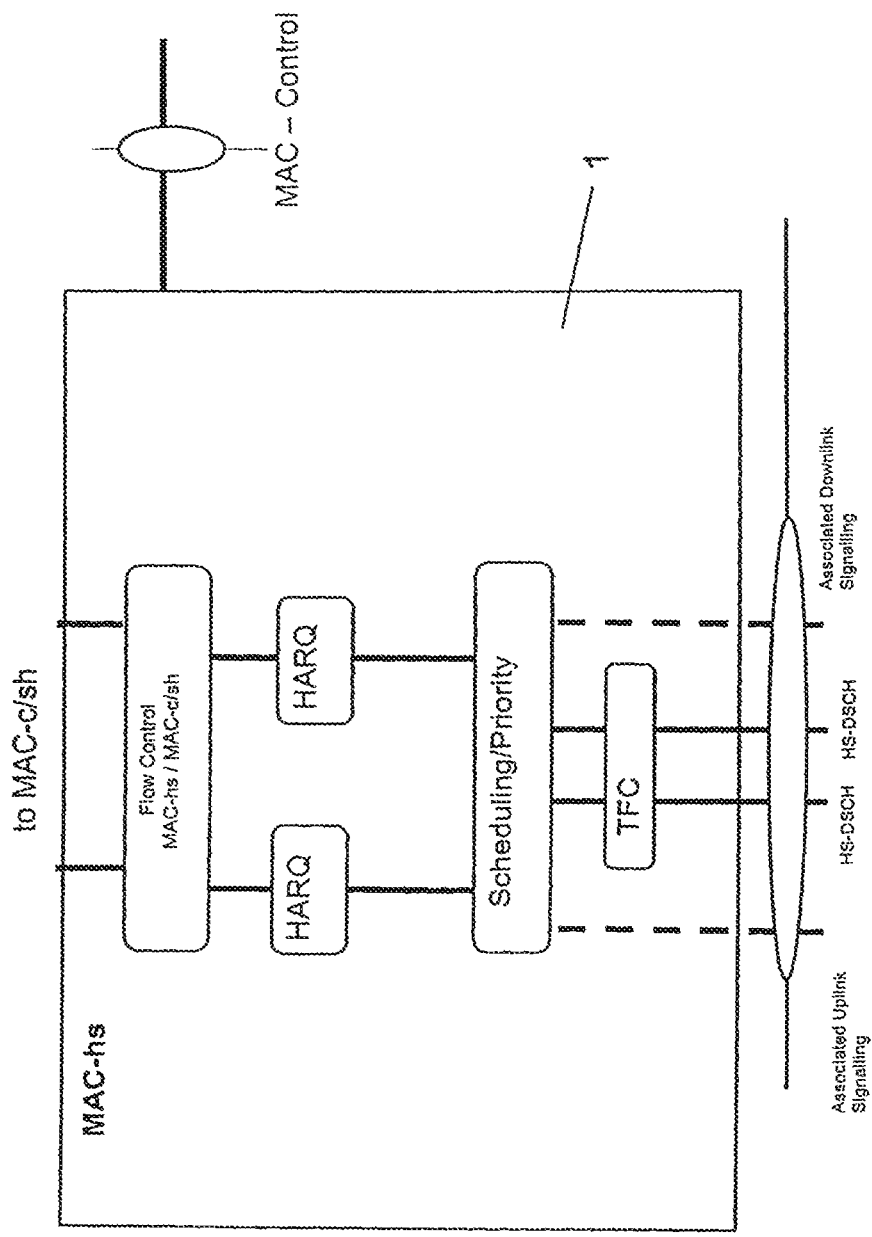
FIG. 3 shows details of a known MAC-hs of a Node B.
Figure 4:
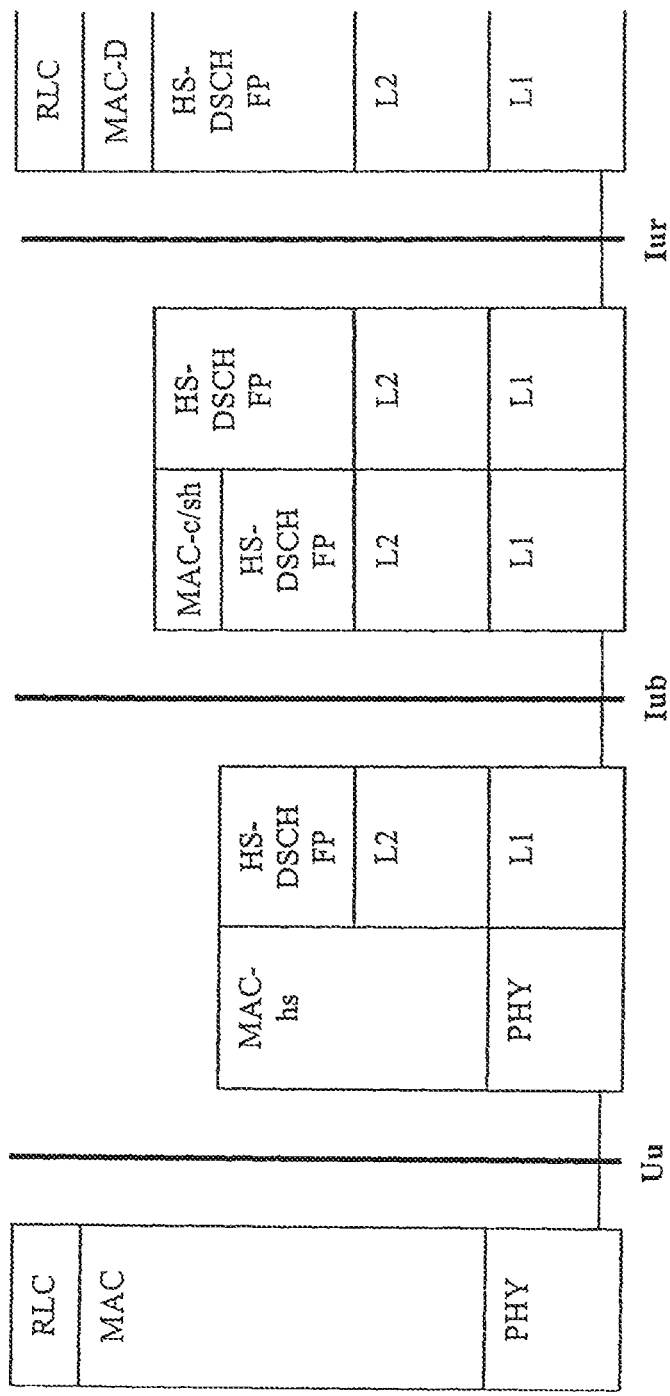
FIG. 4 shows a known radio interface protocol architecture defined for HSDPA.
Figure 5:
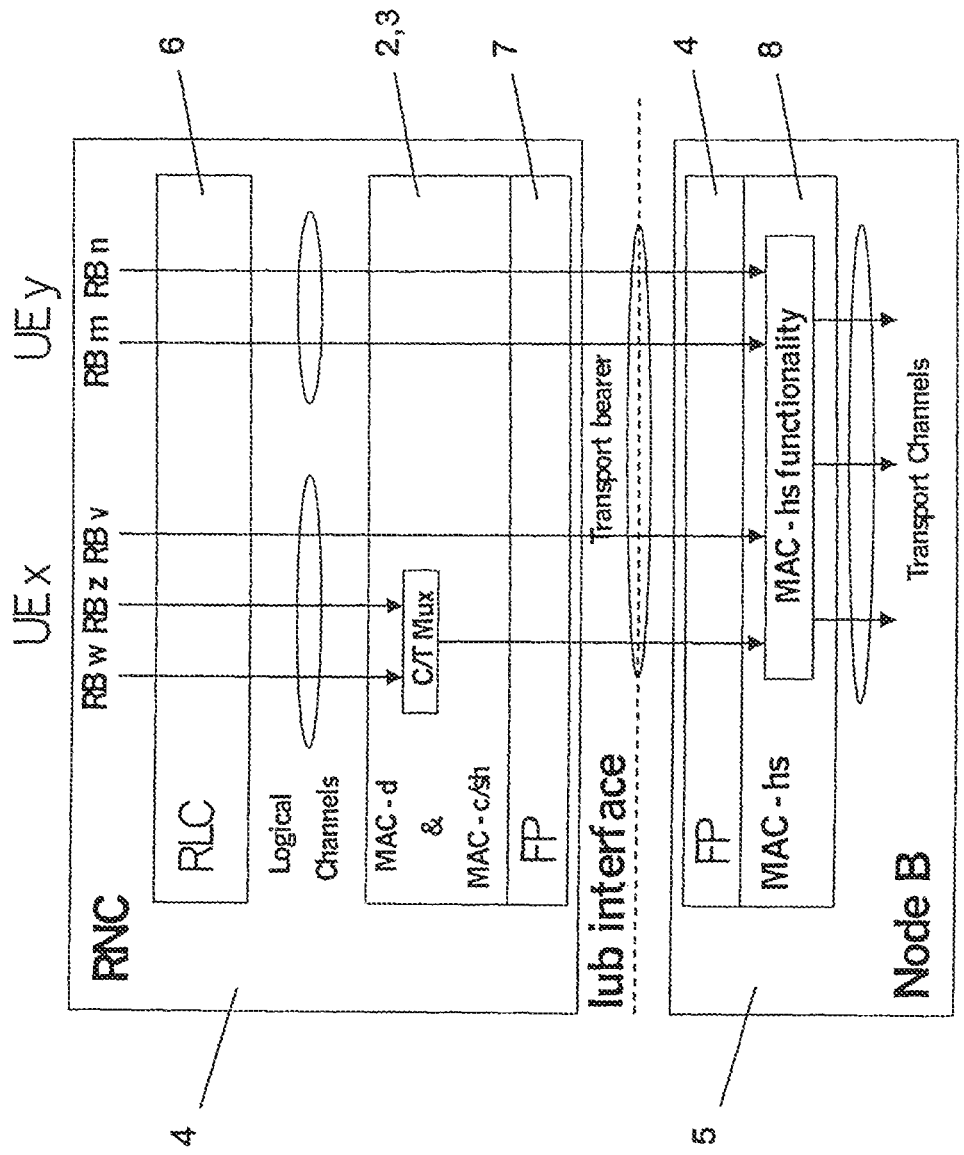
FIG. 5 shows a model for the Iub, when no MAC level multiplexing is allowed in RNC.

In a first model, which is illustrated in FIG. 5, the RNC is not allowed to perform MAC/FP UE-ID level multiplexing.

FIG. 5 schematically shows an RNC 4 and a Node B 5 interconnected by an Iub interface. The RNC 4 comprises an RLC 6, a MAC-d and MAC-c/sh 2, 3 and an FP entity 7. The Node B 5 equally comprises an FP entity 8, and a MAC-hs 1. In a current situation, three radio bearers RB w, z and v are assigned to a first user equipment UEx, while two further radio bearers RB m and n are assigned to a second user equipment UEy. The RBs of UEy and equally RB v of UEx are passed on without multiplexing from the RLC 6 in logical channels via MAC-d and MAC-c/sh 2, 3 and the FP entity 7, the Iub interface and the FP entity 8 of the Node B 5 to the MAC-hs 1. The RBs w and z of UEx are C/T multiplexed in the MAC layer of the RNC 4 and transmitted on a single transport connection via the same entities to Node B 5. C/T multiplexing means the multiplexing of different RBs, i.e. which are using different logical channels, which all are assigned for the same UE on the same transport channel. The MAC-hs 1 then maps the received logical channels onto transport channels.

If C/T multiplexing is allowed to be performed between radio bearers (RB), which all are assigned to the same UE, the minimum number of required Iub transmission connections is equal to the number of UEs having access to the HS-DSCH. C/T multiplexing can be used by an RNC e.g. only for some RBs of some UEs, as in FIG. 5, or for all RBs of all UEs.

Alternatively, a C/T multiplexing of different radio bearers RB into the same Iub transmission connection might not be allowed at the RNC 4 of FIG. 5. C/T multiplexing might not even allowed to provide, e.g. due to different priority levels, if all radio bearers are assigned for the same UE. In this case, the number of transport connections on the Iub interface is equal to the number of radio bearers which are using the HSDPA type transport method.

Figure 6:
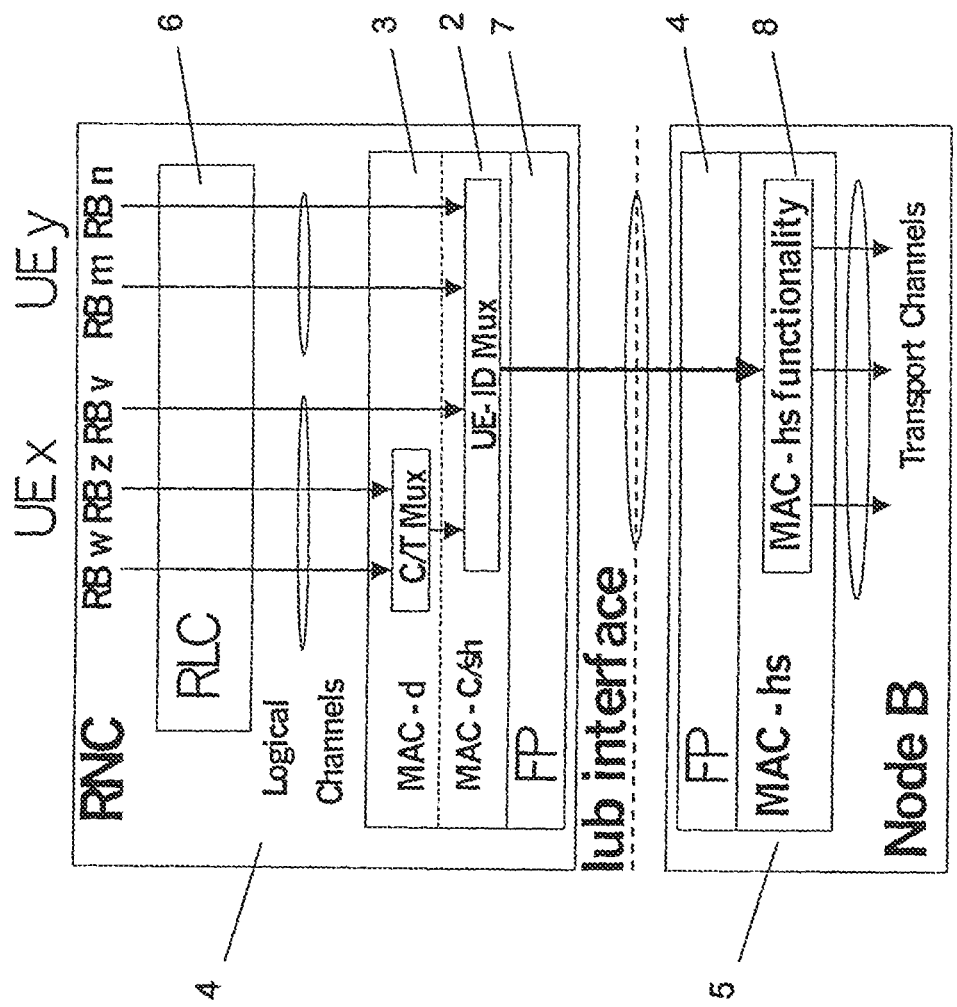
FIG. 6 shows a model for the Iub, when MAC level multiplexing is allowed in RNC.

In a second model, which is illustrated in FIG. 6, the RNC 4 is allowed in contrast to perform MAC level UE-ID multiplexing.

FIG. 6 schematically shows the same structure of an RNC 4 and a Node B 5 interconnected by an Iub interface as FIG. 5. Only in this case, a separate MAC-d 3 and MAC-c/sh 2 are depicted. Moreover, the same radio bearers RB w, z, v, m and n are assigned to the same user equipments UEx, UEy as in FIG. 5. Radio bearers RB w and RB z are again C/T multiplexed in the MAC layer, more specifically by the MAC-d 3. In addition, the output of the C/T multiplexing and the three other radio bearers RB v, m and n are UE-ID multiplexed by the MAC-c/sh 2 to a single transport connection for transmission to the MAC-hs 1 via the FP layer 7 of the RNC 4, the Iub interface and the FP layer 8 of Node B 5. The MAC-hs 1 first performs a demultiplexing, and then a mapping of the logical channels onto transport channels.

In the Node B 5, the MAC layer correspondingly demultiplexes the received information, before mapping it to the HS-DSCHs and further on to the HS-PDSCH as in FIG. 5.

There could also be more than one transport connection used in multiplexing. The general idea in multiplexing is that it is possible that all UEs which fulfill the same criteria can use the same transport resources. The multiplexing can be based for example on the number of cells in the Node B. That means, if the Node B supports more than one cell, one transport connection is provided per cell. Alternatively, the multiplexing could be based on priority levels assigned to the logical channels, i.e. one transport connection is provided per priority. Further, only a single transport connection could be provided for one Node-B. Multiplexing could also be based on the number of HSDPA related physical channels on the Radio interface.

In the second model, MAC/FP UE-ID multiplexing is not restricted in any way, which means that it is possible that all UEs are allowed to use the same transport connection on the Iub interface.

The second model can be provided also by placing the UE-ID multiplexing to the FP layer. In both case, if RNTI is used in the MAC header, no UE-ID is mandatory in the FP frame, and if no identification is included into the MAC header but multiplexing is allowed, then the FP header should contain also the UE-ID field(s).

When MAC/FP UE-ID multiplexing is allowed, the frame structure should be defined in a way that the receiver is able to extract the information belonging to different UEs correctly from a received HSDPA frame.

FIGS. 7 to 10 now show a conventional DSCH FP frame structure defined for the Iub interface presented for comparison, a first embodiment of an HSDPA FP frame structure for the case when no UE-ID multiplexing is allowed and a second and third embodiment of an HSDPA FP frame structure for the case when UE-ID multiplexing is allowed.

Figure 7:
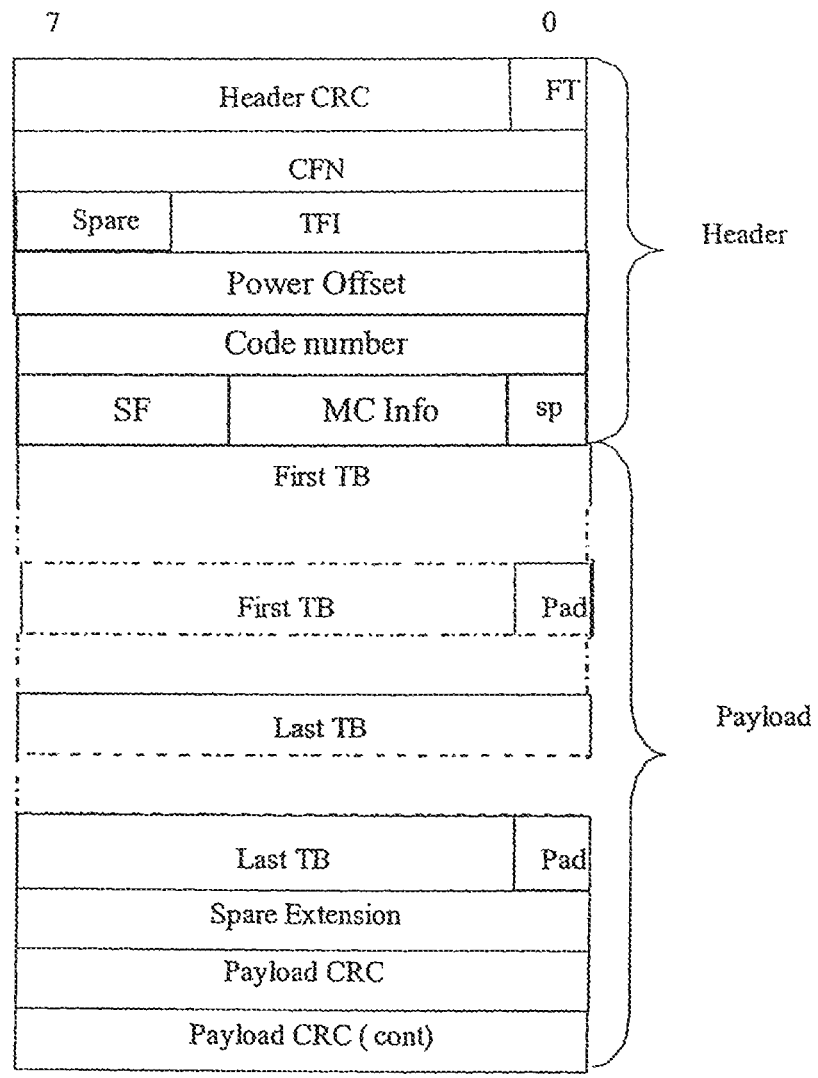
FIG. 7 shows a known DSCH FP frame structure.

The DSCH FP frame structure of FIG. 7 was taken from the technical specification 3GPP TS 25.435, V3.5.0 (2000-12): "3rd Generation Partnership Project; Technical Specification Group Radio Access Network; UTRAN Iub Interface User Plane Protocols for Common Transport Channel Data Streams (Release 1999)". It is composed of a payload section and a header section, each divided into rows of 8 bits 0-7. The payload section comprises first to last TBs (transport blocks), a "Spare Extension", and a "Payload CRC" (cyclic redundancy check). The header section comprises the fields "Header CRC", "FT", "CFN", "TFI", "Power Offset", "Code number", "SF" and "MC Info".

The "CFN" field is used to indicate the connection frame number (CFN), in which the data of a frame should be transmitted through the radio interface. In the HSDPA concept, the value of this field is only known by the Node B after a scheduling of the corresponding data to the radio interface, and therefore the RNC cannot provide this field to the Node B.

The "TFI" field is used to indicate the valid transport format (TF) for the data in the frame. In the HSDPA concept, the TFC selection is carried out in the Node B, and therefore the RNC can not submit such information to the Node B.

The "Power Offset" field is used to indicate the power level requested for the transmission of the data of the corresponding FP frame. This field is needed in the case of DSCH, because for the DSCH a closed loop power control is provided. In the case of HSDPA, no close loop power control is provided, and therefore no power control information is required from the RNC.

The "Code number" field indicates the used code for the DSCH. In the case of HSDPA, the code selection is made in the Node B, and therefore no such information is required from the RNC.

The "SF" field identifies the to be used spreading factor (SF) in a PDSCH for the corresponding data packets in the frame. In the HSDPA concept, the SF is defined in the Node B, and therefore no such information is required from the RNC.

The "MC Info" field is used to indicate the number of parallel PDSCH codes on which the DSCH data will be carried. In the HSDPA concept, this kind of information is defined in the Node B, and therefore no such information is required from the RNC.

Thus, none of the fields of the header section except the "Header CRC" field and the "FT" (frame type) field is required for HSDPA, and these fields can be removed when designing an HSDPA FP frame structure. But on the other hand, if the fields are simply removed, the Node B does not receive enough information for extracting the received FP frame. Therefore, new fields are required in order to guarantee that the flow control mechanisms work as the new MAC entity MAC-hs is located in the Node B.

Figure 8:
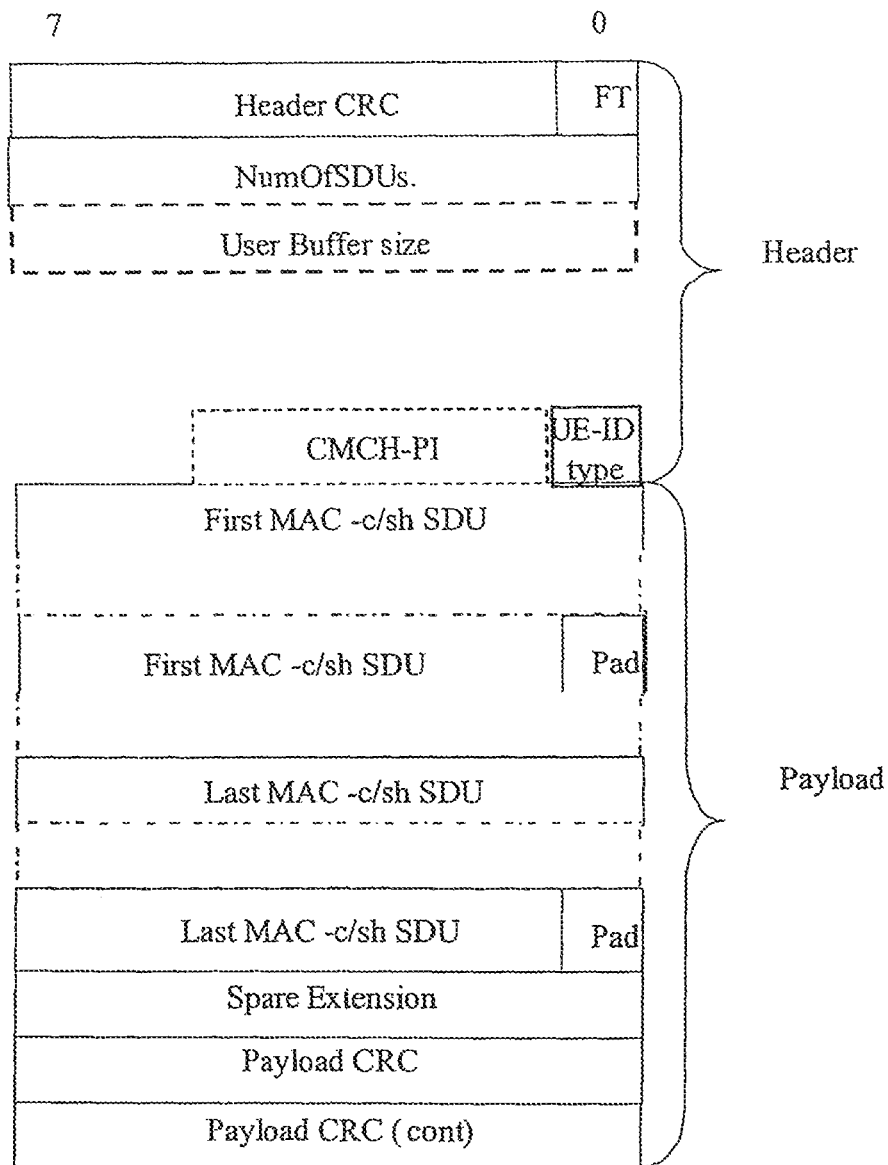
FIG. 8 shows a first embodiment of an HDSPA FP frame structure according to the invention.

FIG. 8 presents an HSDPA frame structure which comprises such new fields for the case that no MAC/FP UE-ID multiplexing is allowed. It is composed again of a payload section and a header section, each divided into rows of 8 bits. Similar to the DSCH frame structure, the payload section comprises first to last MAC-c/sh SDUs (service data units), a "Spare Extension", and a "Payload CRC". The structure of a MAC SDU with a variable header is known from the state of the art as MAC PDU, and will be described below with reference to FIG. 11. The header section now comprises fields referred to by "Header CRC", "FT", "NumOfSDUs", "User Buffer size", "UE-ID type", and "CMCH-PI". In particular an introduction of the last two fields is optional.

The "NumOfSDUs" field is used to indicated the number of the MAC-c/hs SDUs in the frame. The length of the field can be selected suitably.

The "User Buffer size" field is used to indicate the status of the buffer assigned to the respective UE in the RNC buffers (e.g. in bytes). This field informs the Node B how much data belonging to the same data flow is still left in the RNC. A data amount carried in the corresponding FP data frame can be either excluded or included into the user buffer size information field. The Node B may use this information for instance in scheduling so that a data flow which has the highest priority and most data in the RNC buffers gets access to the HSDPA channel earlier than a data flow which has a lower priority and a smaller amount of data in the RNC buffers. Different possible significations of the term RNC buffers will be explained below with reference to FIGS. 12 and 13. The length of the field can be selected suitably.

The "UE Id type" field is used, to indicate what kind of RNTI, i.e. c-RNTI or U-RNTI, the MAC-hs of the Node B should add to the MAC header. The type U-RNTI (UTRAN radio network temporary identity) may be used in a MAC header of the MAC PDU, which payload part contains specific L3 (RRC) signaling messages when the use of the U-RNTI is mandatory. This kind of situation is reported by RRC by sending a command to L2 (MAC layer via RLC layer) to use U-RNTI instead of C-RNTI in a MAC header. The type C-RNTI (Cell radio network temporary identity) is used on DTCH and DSCH in FDD (frequency division duplex) mode, and may be used in a MAC header, when no request to use U-RNTI is received from upper layers (RRC). The UE ID type field is required only if the RNTI is specified to be added in the Node B. If the RNTI is specified to be added in an SRNC or if no RNTI at all is used for HSDPA data transmissions, such a field is not required in the HSDPA FP data frame. The length of the field is one bit.

The common transport channel priority indicator ("CMCH-PI") field is used to indicate the relative priority of the data frame and/or of the SDUs included. For HSDPA data transmissions the use of this field can be introduced, but the priority of the RB when no multiplexing is provided could be introduced upon time when the corresponding transport connection over the Iub is configured.

In this first embodiment of an HSDPA FP frame structure, it is not necessary that a field for a MAC SDU size information is included, because for HSDPA it has been defined that semi-static TB sizes will be used, wherein the MAC SDU is of a fixed size in case no multiplexing is allowed.

Figure 9:
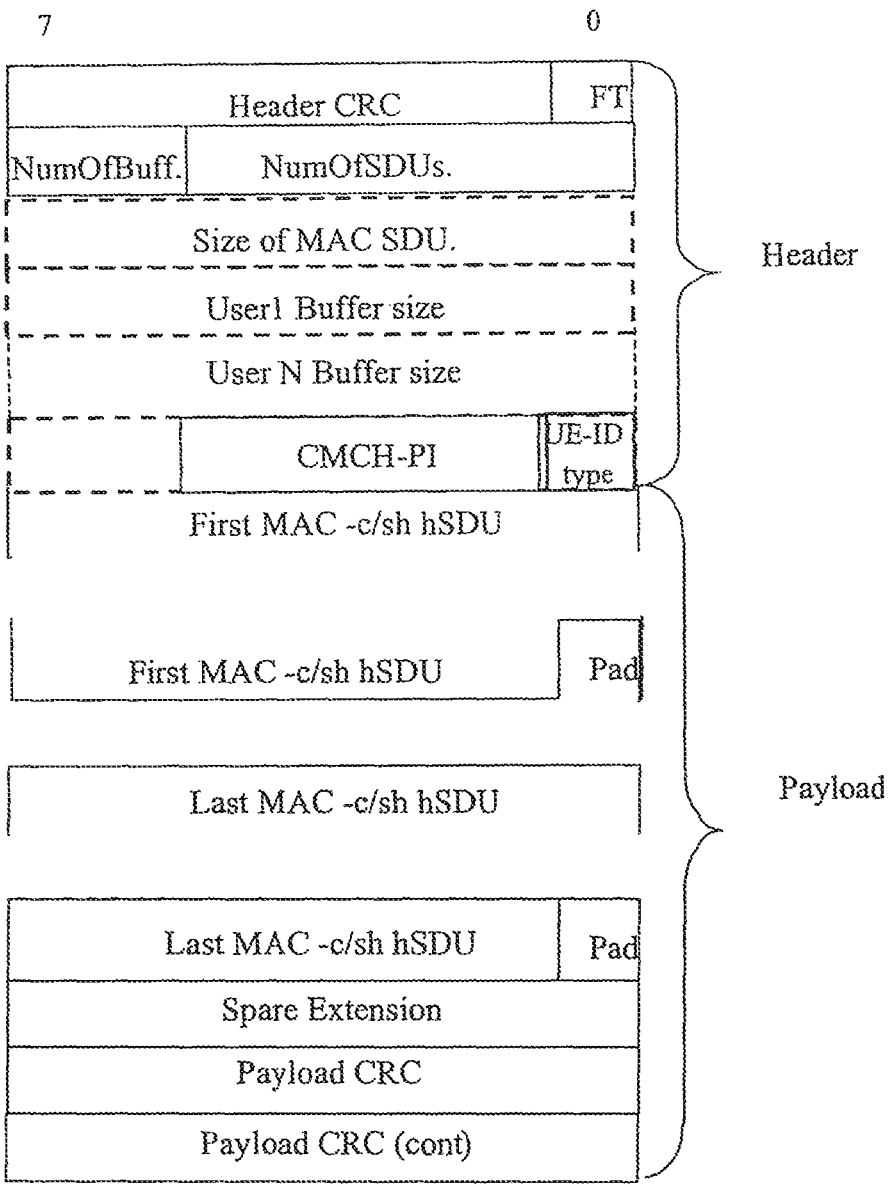
FIG. 9 shows second embodiment of an HDSPA FP frame structure according to the invention.

FIG. 9 presents an HSDPA frame structure which comprises new fields for the case that MAC/FP UE-ID multiplexing is allowed. It is composed again of a payload section and a header section, each divided into rows of 8 bits. Similar to the DSCH FP frame structure and the first embodiment of an HSDPA FP frame structure, the payload section comprises first to last MAC-c/sh SDUs (service data units), a "Spare Extension", and a "Payload CRC". The header section now comprises fields referred to by "Header CRC", "FT", "NumOfSDUs", "NumOfBuff", "Size of MAC SDU", "User Buffer size" 1-N, "UE-ID type", and "CMCH-PI". Also for "NumOfSDUs", "NumOfBuff2, "Size of MAC SDU", and "CMCH-PI" there may be several fields, even though only one field for each parameter is indicated in the figure.

The "NumOfSDUs" field is used to identify the number of the MAC-c/sh SDUs which have been taken from one RNC buffer. The length of the field can be set suitably. The number of this kind of fields is equal to the number of "NumOfBuff" fields.

The "NumOfBuff" field indicates from how many RNC buffers data has been supplied to this FP frame. It is to be noted that this field does not describe the number of RNC buffers from which data could be supplied. The length of the field can be set suitably.

The "Size of MAC SDU" field is introduced because the MAC multiplexing is not a mandatory feature, i.e. it is possible that even if MAC/FP UE-ID multiplexing is allowed, some operators do not want to use it. Therefore, to support the multivendor case when MAC/FP UE-ID multiplexing is allowed, the size of MAC SDU field defines the size of the SDUs in the respective frame. In principle, a TB has always a fixed size in HSDPA, but since the MAC header is of variable length depending on whether MAC/FP UE-ID multiplexing is supported or not, the size of the MAC SDU can vary depending on the content or existence of the MAC header. This information is required at the receiver side in order to extract SDUs from the HSDPA data frame correctly. The length of the field can be set suitably.

The "User Buffer size" field is used to indicate the status of the buffer assigned to one UE in the RNC buffers in bytes. The length of the field can be set suitably. The number of fields of this kind in a frame is equal to the number of "NumOfBuff" fields.

The "CMCH-PI" field could be used to provide an information about the priority of the data when MAC/FP UE-ID multiplexing is allowed. If it is allowed to multiplex data with different priority levels, then the number of fields of this kind must be equal to the number of the "NumOfBuffer" fields, but if no such multiplexing is allowed, it is sufficient to provide one "CMCH-PI" field per frame.

It is to be noted that even if MAC/FP UE-ID multiplexing is allowed, the number of the respective multiplexing related fields "NumOfSDUs", "User Buffer size", "Size of MAC SDUs" and "CMCH-PI" can be decreased, if a restriction is identified that one HSDPA FP frame can contain only data which belongs to one UE or RB. In this case the MAC/FP UE-ID multiplexing is made based on a time division method.

A further modification of the HSDPA FP frame structure presented as third embodiment relates to an identification of user equipment in HSDPA related data transmissions.

If no UE identification is required in the Node B, and thus no MAC/FP UE-ID multiplexing is allowed in the RNC, an identification of the UE is neither included in the RNC nor in the Node B. The data is rather identified by using other methods.

However, if a UE identification is required, the places where this information can be coupled with the data is either the MAC-c/sh in a CRNC or the MAC-hs in a Node B. In the first case, the used UE identification could be either the currently used RNTI or it can be a new UE identification which is defined only for the transmission of data over the Iub interface.

If RNTI is used, the UE identification information can be included either in the MAC-c/sh SDU headers, which already have fields for this purpose, or in the header section of the respective HSDPA FP data frame. If it is included in the MAC-c/sh SDU header, the Node B has to extract this header part in order to find out the identity of the UE. If the UE identity is included into the header section of a HSDPA FP data frame, no extraction is required.

For the frame structure of FIG. 9 it was assumed that if UE identification is required, the identification is RNTI and is include into the MAC SDU header either in the CRNC or in the Node B.

Figure 10:
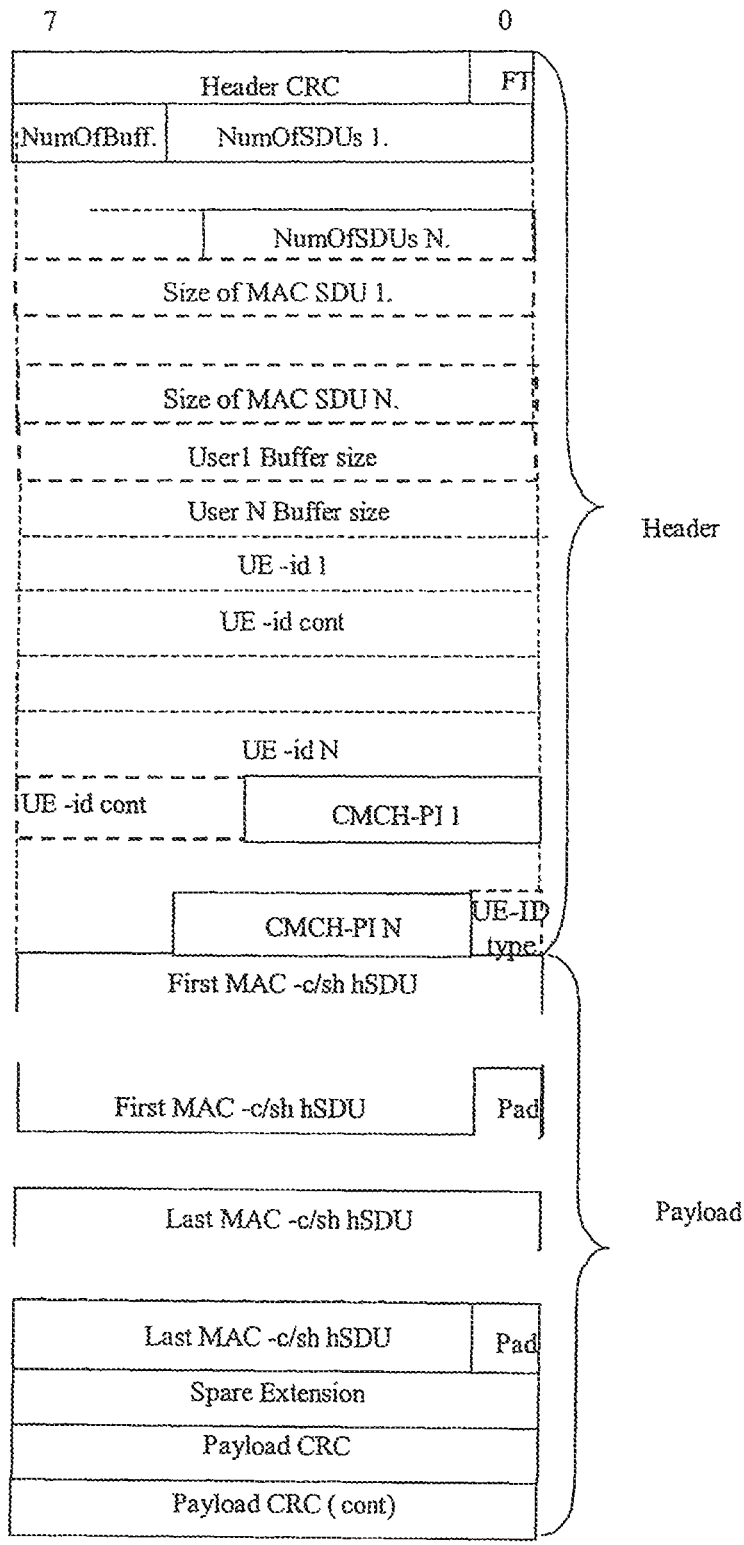
FIG. 10 shows third embodiment of an HDSPA FP frame structure according to the invention.

For the case that no RNTI is desired on the air interface, but that still a UE identification is desired on the Iub, a third embodiment of a frame structure is presented, which is illustrated in FIG. 10.

The frame structure of FIG. 10 again supports MAC/FP UE-ID multiplexing and comprises all fields present in the frame structure of FIG. 9. It comprises additional fields "UE-id 1" to "UE-id N" for identifying UEs for which data is included in MAC-c/sh SDUs in the payload section. In this figure, there are also N different fields "NumOfBuff", "NumOfSDUs", "Size of MAC SDU", and "CMCH-PI", respectively, explicitly indicated.

The content of the UE identification fields "UE-id" can be the RNTI, but in order to save transmission capacity on the Iub interface, also a new shorter identification could be defined. The length of this field thus depends on the selected kind of identification. The number of the "UE-id" fields depends on whether one HSDPA frame can contain data for different UEs. If this is allowed, the number of the fields must be equal to the number of the "NumOfBuff" fields. However, if MAC/FP UE-ID multiplexing is allowed, i.e. more than one UE is using the same transport connection on the Iub interface, but one HSDPA FP frame can contain data only from one RNC buffer, the number of required UE identification fields is 1.

Figure 11:
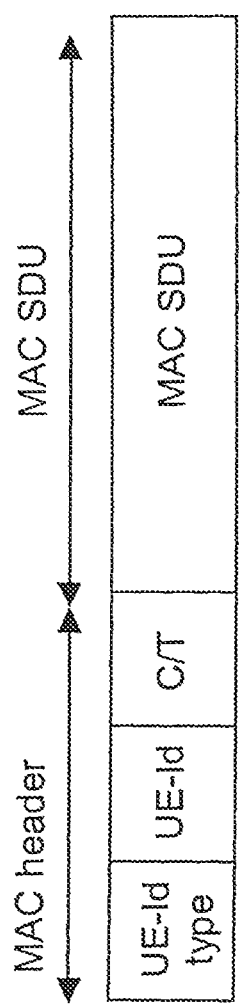
FIG. 11 illustrates a MAC PDU structure.

FIG. 11 presents the MAC PDU structure when DTCH or DCCH are mapped to DSCH and when DTCH or DCCH are the only logical channels, and which can be employed also for HSDPA. The figure was taken from the technical specification 3GPP TS 25.321 V3.6.0 (2000-12): "3rd Generation Partnership Project; Technical Specification Group Radio Access Network; MAC protocol specification (Release 1999)".

The MAC PDU in FIG. 11 is composed of a MAC SDU and a MAC header. The header comprises a "UE-Id type" field, a "UE-Id" field and a "C/T" field. The "UE-Id type" and the "UE-Id" fields are included in the MAC header for FDD only. The "UE-Id" field provides an identifier of the UE on common transport channels. The "UE-Id Type" field is needed to ensure a correct decoding of the UE-Id field in MAC Headers. The "C/T" field is included in the MAC header if C/T multiplexing on MAC is applied. The "C/T" field provides an identification of the logical channel instance when multiple logical channels are carried on the same transport channel. The "C/T" field is also used to provide an identification of the logical channel type on dedicated transport channels and on FACH (forward access channel) and RACH (random access channel) when used for user data transmission. The size of the "C/T" field is fixed to 4 bits for both, common transport channels and dedicated transport channels.

For the first aspect of the invention, finally an example is presented of how the FP frame header field values in a frame according to the frame structure in FIG. 10 can be set for two different models for the RNC buffers.

Figure 12:
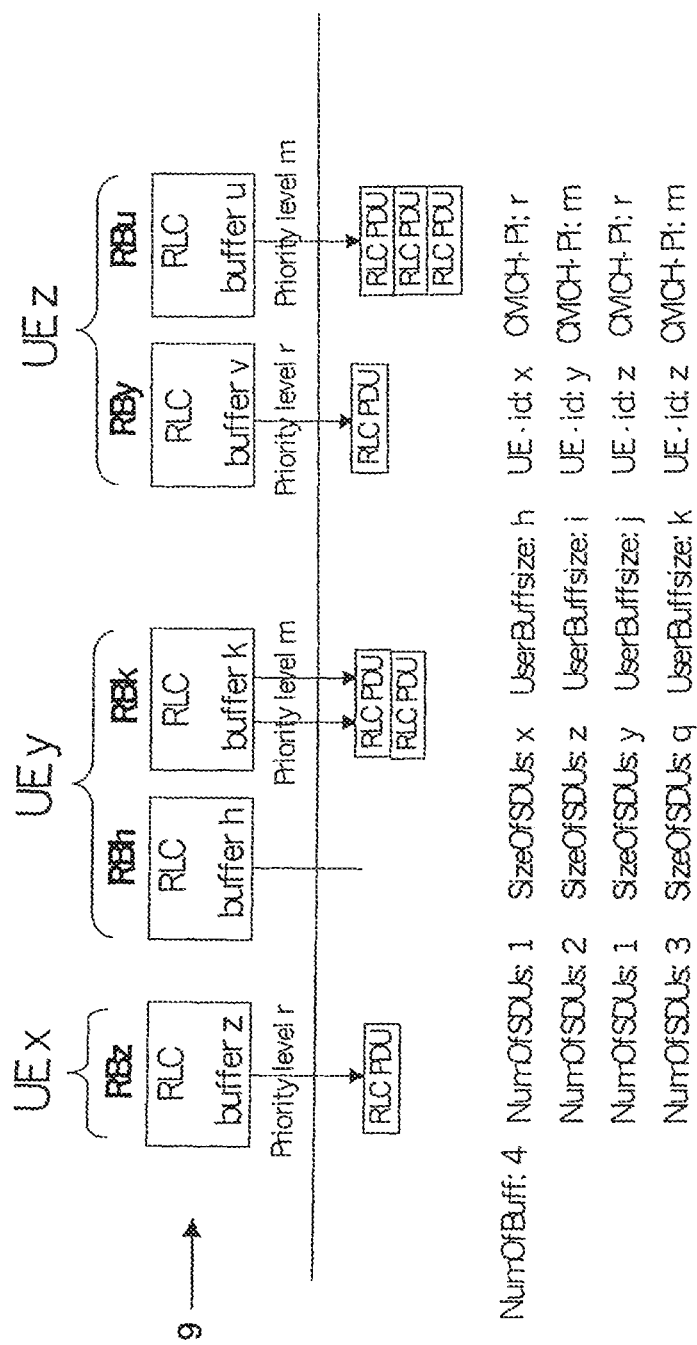
FIG. 12 shows a first example of possible FP frame header field values for the embodiment of FIG. 10.

The first buffering model is illustrated in FIG. 12. In this alternative, the last RNC buffers before the Node B buffers are located on the RLC layer in the RNC.

FIG. 12 shows five of such RNC buffers 9, RLC buffer z, h, k y and u. RLC buffer z is assigned to the data for a user equipment UEx, more specifically to a radio bearer RBz used for this UE. It outputs data with a priority level r for use in one RLC PDU. RLC buffers h and k are assigned to radio bearer RBh and RBk respectively, which are both used for user equipment UEy. Only buffer k, however, outputs data for distribution to RLC PDUs. More specifically two logical channels are provided from the RLC layer by buffer k. To the data a priority level m is assigned, and the data is distributed to two RLC PDUs. RLC buffers y and u are assigned to radio bearer RBy and RBu respectively, which are both used for user equipment UEz. Buffer v outputs data with a priority level r for use in one RLC PDU. Buffer u outputs data with a priority level of m, which data is distributed to three RLC PDUs. Each RLC PDU will be used in the MAC layer as basis for one MAC-c/sh SDU in an assembled HSDPA FP frame.

In the model of FIG. 12, the value of the field "NumOfBuff" can be defined based on RBs. That means, the value of the field "NumOfBuff" is equal to the number of RBs, and thus the number of RLC buffers 9, which provide data for the HSDPA FP frame. Thus, in the presented example, the value of the field "NumOfBuff" of a data frame based on the frame structure of FIG. 10 is set to 4, since the data is extracted from four of the RNC buffers, i.e. RLC buffers z, k, y and u.

The value of the field "NumOfSDUs" for RLC buffer z is set to 1, since only data for one RLC PDU was extracted from this buffer for the current frame. For RLC buffer k, the value of the field "NumOfSDUs" is set to 2, since data for two RLC PDUs was extracted from this buffer for the current frame. For RLC buffer v, the value of the field "NumOfSDUs" is set again to 1, since only data for one RLC PDU was extracted from this buffer for the current frame. For RLC buffer u, the value of the field "NumOfSDUs" is set to 3, since data for three RLC PDUs was extracted from this buffer for the current frame.

The value of the fields "SizeOfSDUs" and "User Buffer size" are set to the respectively applicable values. In the depicted example, user equipment UEy has an RLC entity from which two different logical channels are provided to the MAC layer, as indicated in the figure. Such a configuration is possible in an acknowledged RLC mode. Even if data has been received from two logical channels, the buffer size information needs to be combined, which means that the "User Buffer size" field contains information about the status of RLC buffer k.

The value of the field "UE-id" for RLC buffer z is set to x, since the data in this buffer is meant for UE x. The value of the field "UE-id" for RLC buffer k is set to y, since the data in this buffer is meant for UE y. The value of the field "UE-id" for RLC buffers y and u is set to z, since the data in these buffer is meant for UE z.

The value of the field "CMCH-PI" for RLC buffer z and RLC buffer v respectively is set to r, since the priority level for the data extracted from these two buffers was set to r. The value of the field "CMCH-PI" for RLC buffer k and RLC buffer u respectively is set to m, since the priority level for the data extracted from these two buffers was set to m.

Figure 13:
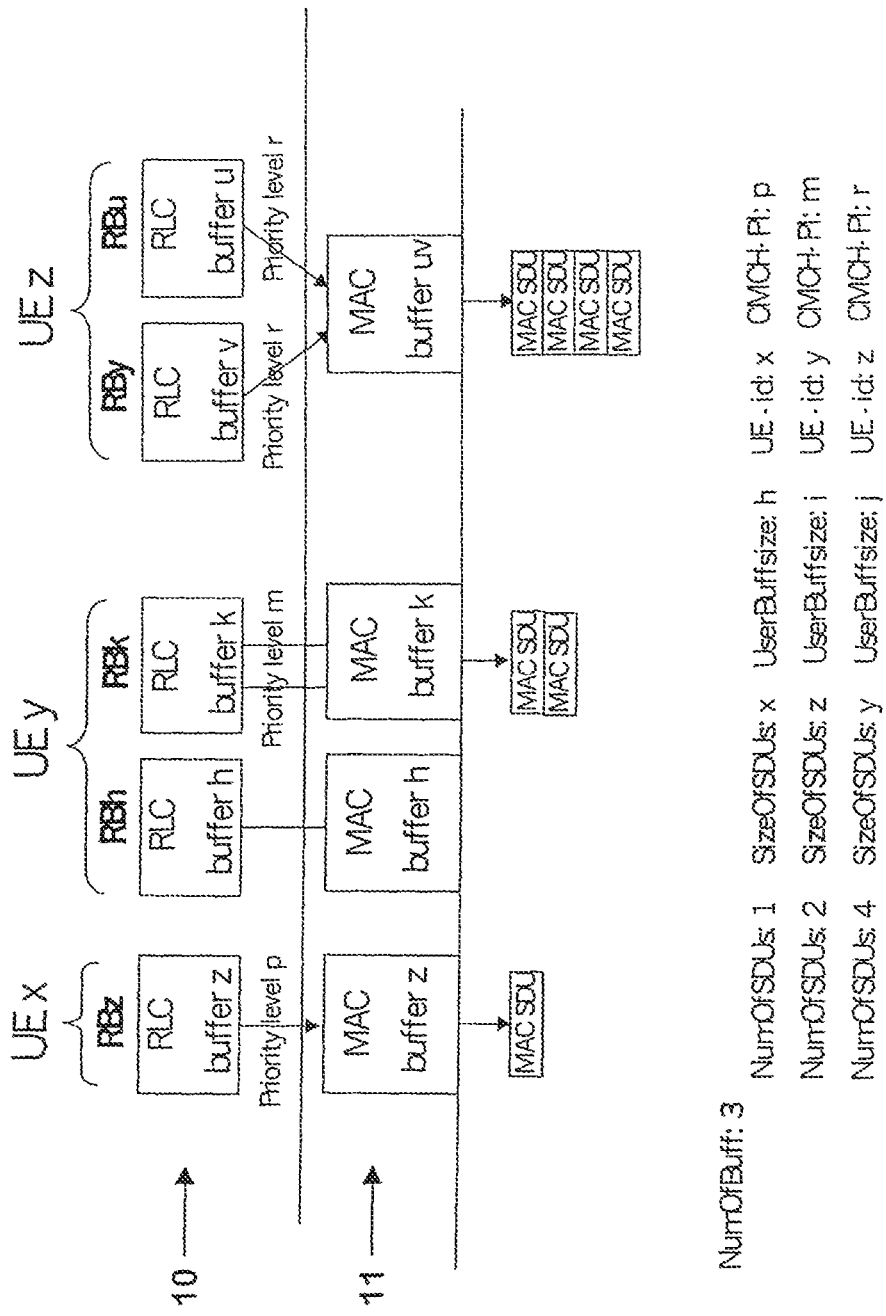
FIG. 13 shows a second example of possible FP frame header field values for the embodiment of FIG. 10.

Another way to realize the RNC buffers is to locate the last buffers before the Node B buffers to the MAC layer of the RNC, e.g. to the MAC-c/sh, which is illustrated in FIG. 13.

FIG. 13 shows again five RLC layer buffers 10 of an RNC, RLC buffer z, h, k, v and u. In this case, however, in addition four MAC layer buffers 11 are present, MAC buffer z, h, k, and uv.

RLC buffer z is assigned again to a radio bearer RBz used for user equipment UEx. RLC buffer z outputs data with a priority level p to MAC buffer z, which MAC buffer outputs data for use in one MAC SDU. RLC buffers h and k are assigned again to radio bearer RBh and RBk respectively, which are both used by user equipment UEy. RLC buffer h is connected to MAC buffer h and RLC buffer k to MAC buffer k, but only RLC buffer k forwards data to MAC buffer k with an assigned priority level of m. MAC buffer k outputs data that is to be distributed to two MAC SDUs. RLC buffers v and u are assigned again to radio bearer RBy and RBu respectively, which are both used for user equipment UEz. Both, RLC buffer v and RLC buffer u, forward received data with the same priority level r to MAC buffer uv. MAC buffer uv outputs data that is to be distributed to four MAC SDUs.

In the buffering model according FIG. 13, the value of the "NumOfBuff" field defines the number of MAC level buffers 11 from which data is supplied to the corresponding HSDPA FP data frame. Thus, in the presented example, the value of the field "NumOfBuff" of a data frame based on the frame structure of FIG. 10 is set to 3, since the data is extracted from three MAC buffers, i.e. MAC buffers z, k, and vu.

The value of the field "NumOfSDUs" for MAC buffer z is set to 1, since only data for one MAC SDU was extracted from this buffer for the current frame. For MAC buffer k, the value of the field "NumOfSDUs" is set to 2, since data for two MAC SDUs was extracted from this buffer for the current frame. For MAC buffer uv, the value of the field "NumOfSDUs" is set to 4, since data for four MAC SDUs was extracted from this buffer for the current frame.

The values of the fields "SizeOfSDUs" and "User Buffer size" are set to the respectively applicable values.

The value of the field "UE-id" for MAC buffer z is set to x, since the data in this buffer is meant for UE x. The value of the field "UE-id" for MAC buffer k is set to y, since the data in this buffer is meant for UE y. The value of the field "UE-id" for MAC buffer uv is set to z, since the data in this buffer is meant for UE z.

The value of the field "CMCH-PI" for MAC buffer z is set to p, since the priority level for data provided to this buffer was set to p. The value of the field "CMCH-PI" for MAC buffer k is set to m, since the priority level for data provided to this buffer was set to m. The value of the field "CMCH-PI" for MAC buffer uv is set to r, since the priority level for data provided to this buffer was set to r.

In the example of FIG. 13, several RBs assigned to the same UE may use a common MAC buffer 11, if they have for example a common priority value. It would also be possible to use a common MAC buffer 11 for all RBs having a common priority value for the transmitted UE information, regardless of the UE to which the RBs are assigned. This would make the flow control much more complex, though.

In the whole, different HSDPA FP frame structures according to the first aspect of the invention were presented which can be employed advantageously for different situations for transmitting HSDPA related user data together with required additional information from an RNC to a Node B of a UTRAN. The presented frame structures can be modified in any suitable way in order to provide an optimal adaptation to specific requirements.

Now, an embodiment of the second aspect of the invention will be presented for an HSDPA capable UTRAN comprising an RNC and a Node B interconnected by an Iub interface. In this embodiment, an Iub application protocol is provided, which defines several IEs that can be added by the RNC to selected control messages transmitted via the Iub interface to the Node B, in order to enable the Node B to configure the HSDPA.

FIG. 14 shows a table with a set of new semi-static "HS_DSCH Information" IEs comprising cell related parameters with HS-DSCH related information which can be used by a Node B for configuring HSDPA in a cell and the characteristics of the implemented HARQ. The table has the format of tables used by 3GPP for defining IEs, e.g. in the above cited technical specification TS 25.433. These tables comprise a respective column for an IE/Group Name, the requirements on the presence of the IE, a range, an IE type and a reference, a semantic description, a criticality, and an assigned criticality. In FIG. 14 only the column "IE/Group Name" is used. The other columns can be completed according to the respective requirements.

A first IE in the set of the table of FIG. 14 is called "MCS Sets". It comprises the sets of modulation and coding schemes (MCS) from which Node B can choose every TTI for transmissions.

A second IE in this set is called "HS_DSCH Power Level". This IE defines the relationship between the HS-DSCH and the CPICH (common pilot channel) code power level in case of NQAM (n-symbol quadrature amplitude modulation).

A third IE in this set is called "NumOfCodes", which defines the number of code channels which will be assigned to HS-DSCHs. The RNC can assign the number of code channels for a cell to enable the configuration of HS-DSCH characteristics.

A fourth IE in this set is called "TTI Selection". The "TTI Selection" includes an information about the TTI length which the Node B shall use.

Further included in the table is the "HARQ Information", which is an IE group that might include several HARQ specific IEs, which IEs depend on the selected HARQ implementation. The "HARQ Information" group defines information to configure HARQ in Node B. The parameters of this group allow the RNC to restrict the capacity of the Node B. In FIG. 14, the IE group "HARQ information" includes the IEs "NumOfChannel", "MaxAttempt" and "RedudancyVer". In case an n-channnel SAW-HARQ is used, the IE "NumOfChannel" can be included to enable the RNC to configure the number of channels. Assuming moreover that the Node B can reject a UE retransmission request after a certain amount of trials, the inclusion of the IE "MaxAttempt" enables the RNC to provide the Node B with a maximum number of trials, and the Node B can then decide to reject or not to reject a request under this limitation according to its own conditions. Finally, in case that an incremental redundancy method is used instead of a soft/chaise combining method, the IE "RedundancyVer" can define the restriction of redundancy versions from which the Node B can choose.

Especially the IE "NumOfCodes" and the IEs belonging to the IE group "HARQ Information" are providing limits to the Node B, which Node B can select the proper value dynamically from within the set bound. It would also be possible to classify these parameters alternatively as fixed value and/or as RL specific values.

The described cell specific IEs can be added to the CELL SETUP procedure and the CELL RECONFIGURATION procedure and be included by the RNC in HSDPA related CELL SETUP REQUEST messages and CELL RECONFIGURATION REQUEST messages transmitted by the RNC to the Node B.

FIGS. 15 to 17 each show a table with a set of IEs comprising RL related parameters that can be used by the Node B to setup and reconfigure HS-DSCH channels. The IEs can be added in the RADIO LINK SETUP procedure and the SYNCHRONIZED RADIO LINK RECONFIGURATION PREPARATION procedure. The tables have the same format as the table of FIG. 14.

The table of FIG. 15 only contains one IE "HS_DSCH ID". This IE uniquely identifies a HS-DSCH within a Node B Communication Context.

The table of FIG. 16 comprises "HS_DSCH Information Response" IEs, which provide information for HS-DSCHs that have been established or modified. The range of entries for each IE is from 1 to the maximum numbers of HS-DSCHS for one UE.

A first IE in this set is again the already mentioned IE "HS_DSCH ID", which should be included mandatorily.

A second IE in this set is called "Binding ID", and can be included optionally. The "Binding ID" is the identifier of a user data stream. It is allocated at the Node B and it is unique for each transport bearer under establishment to or from the Node B. The meaning is thus the same as for DSCH.

A third IE in this set is called "Transport Layer Address" and can also be included optionally. This IE defines the transport address of the Node B. The meaning is thus the same as for DSCH.

The IEs of the table of FIG. 16 can be included in RADIO SETUP RESPONSE messages and RADIO LINK RECONFIGURATION READY messages.

The table of FIG. 17 comprises "HS_DSCH FDD Information" IEs, which provide information for HS-DSCHs that are to be established. The range of entries for each IE is again from 1 to the maximum numbers of HS-DSCHS for one UE.

A first IE in this set is again the above mentioned IE "HS_DSCH ID".

A second IE in this set is called "UE_ID" and is employed to enable the Node B to distinguish between different UEs. This IE will be used to fill up the MAC header. It can be RNTI or something else, e.g. a new kind of user equipment identity indication, which could be transparent for the UE.

A third IE in this set is called "Transport Format Set". The "Transport Format Set" is defined as the set of transport formats associated to a Transport Channel, e.g. HS-DSCH.

A fourth IE in this set is called "Allocation/Retention Priority". This parameter indicates the priority level in the allocation and retention of the internal resources of the Node B. The meaning is thus the same as for DSCH.

A fifth IE of this set is called "Frame Handling Priority". This parameter indicates the priority level to be used during the lifetime of the HS-DSCH for temporary restrictions of the allocated resources due overload reason. The meaning is the thus same as for DSCH.

A sixth IE of this set is called "ToAWE". The parameter "ToAWE" is the time of arrival of the window endpoint. Downlink data frames are expected to be received before this window endpoint. The meaning is thus the same as for DSCH.

A seventh IE of this set is called "ToAWS". The parameter "ToAWS" is the time of arrival of the window startpoint. Downlink data frames are expected to be received after this window startpoint. The meaning is thus the same as for DSCH.

An eighth IE of this set is called "NumOfCodes" and was already mentioned as possible cell based parameter. The RNC could select the value for this parameter according to the respective UE capability.

A ninth IE of this set is called "BufferStatus" and indicates the current status of RNC buffers. This parameter can be used at the beginning of the connection for the flow control.

Further included in the set is the "HARQ Capacity", which is an IE group that might include several HARQ specific IEs identical to those of the "HARQ Information" group in the table of FIG. 14. But even though the names of IEs are identical in both cell-specific and RL-specific case, the meanings are slightly different, since in the cell-specific case the "HARQ Information" restricts the cell capacity, while in the RL-specific case the "HARQ Capacity" reflects the QoS (Quality of Service) of the radio link or the UE capability.

The IEs of this table can be included in RADIO LINK SETUP REQUEST messages and RADIO LINK RECONFIGURATION PREPARE messages.

A further HSDPA specific set of IEs is defined for HS-DSCH Information that is to be modified. This set comprises a subset of the set for "HS-DSCH FDD information". More specifically, it includes the IEs "HS-DSCH ID", "Transport Format Set", "Allocation/Retention Priority", "Frame Handling Priority", "ToAWS", "ToAWE", and "NumOfCodes", and possibly the IEs of the "HARQ Capacity" group. The IEs of this set can also be included in RADIO LINK RECONFIGURATION PREPARE messages.

Many of the RL related IEs have a corresponding meaning as DSCH related IEs presented e.g. in the above cited technical specification TS 25.433, which is incorporated by reference herein and to which is referred for further details.

Not known for DSCH is the IE group "HARQ Capacity", which denotes HARQ characteristics of a RL, and which could also reflect the UE capabilities and/or the QoS of the RL.

Moreover, the IE "UE_ID" was added as a new parameter in order to help complete the MAC header in the Node B. If no ID is included or needed in the MAC header, this parameter can be used alternatively on the FP layer for the same purpose.

The IE "Transport Format Set" is very similar to the corresponding IE for DSCH, but for some IEs new values shall be defined to support HS-DSCH. This is indicated in FIG. 18, which shows a table for the DSCH transport format set taken from the above cited specification TS 25.433 with some underlined modifications.

More specifically, some more possible values are added for the "Transmission time interval" IE, namely "1slot", "3slot", "5slot" and "15slot". These values are to be used for HS-DSCH only and no other values are to be applicable to HS-DSCH. In addition, the "Convolutional" value should not be used in the "Type of channel coding" IE for HSDPA.

Thus, in the presented embodiment of the second aspect of the invention, basic IEs are defined which can be provided during cell setup and reconfiguration and RL setup and reconfiguration to support HSDPA. The described sets of IEs and the IEs themselves can be modified in any suitable way in order to be adapted to specific requirements. Equally, further sets of IEs can be defined in the Iub application protocol in order to enable any required transfer of HSDPA related control information.

The invention claimed is:

1. An apparatus comprising:
   a processor configured to insert at least one control parameter into at least one kind of control message; and
   a transceiver configured to transmit said control message from a controller of a communications network over an interface to a network element to enable the network element to configure at least one communication channel between the network element and a user device,
   wherein said at least one control parameter comprises at least one of:
   sets of a modulation and coding schemes from which said network element can choose every transmission time interval for high speed downlink packet access transmissions;
   the number of code channels which will be assigned to high speed downlink shared channels used by said network element;
   an indication of a transmission time interval length to be used by said network element; and
   one or more parameters to be used by said network element to configure a hybrid automatic repeat request implemented in said network element.

2. An apparatus according to claim 1, wherein said communications network is a universal mobile telecommunications services terrestrial radio access network, wherein said network element is a Node B, wherein said controller is a radio network controller and wherein said interface is an Iub interface.

3. An apparatus according to claim 1, wherein the content of said at least one control parameter is a fixed value, a limiting value or a sequence of allowed values to be used by said network element.

4. An apparatus according to claim 1, wherein said at least one control parameter is comprised in at least one information element and is inserted into a control message by adding said information element to a control message of said at least one kind of control message transmitted from said controller to said network element over said interface.

5. An apparatus according to claim 1, wherein said at least one control parameter comprises in addition a power level to be used by said network element for high speed downlink shared channels in high speed downlink packet access.

6. An apparatus according to claim 1, wherein said one or more parameters to be used by said network element to configure hybrid automatic repeat request includes at least one of the number of channels to be used for hybrid automatic repeat request, the maximum number of attempts for hybrid automatic repeat request, and restrictions of redundancy versions from which said network element can choose.

7. An apparatus according to claim 1, wherein said at least one kind of control message is a CELL SETUP REQUEST message and/or a CELL RECONFIGURATION REQUEST message.

8. An apparatus comprising a component configured to provide a network element of a communications network via an interface in accordance with an interface application protocol with at least one control parameter by inserting said at least one control parameter into a control message transmitted from a controller of said communications network over said interface to said network element to enable the network element to configure at least one communication channel between the network element and a user device, said at least one control parameter comprises at least one of:

sets of a modulation and coding schemes from which said network element can choose every transmission time interval for high speed downlink packet access transmissions;

the number of code channels which will be assigned to high speed downlink shared channels used by said network element;

an indication of a transmission time interval length to be used by said network element; and one or more parameters to be used by said network element to configure a hybrid automatic repeat request implemented in said network element.

9. A communications network comprising an apparatus according to claim 8 and a network element.

10. A controller according to claim 8, wherein said apparatus is said controller and wherein said controller is an radio network controller of a universal mobile telecommunication services terrestrial radio access network.

11. An apparatus according to claim 8, wherein the content of said at least one control parameter is a fixed value, a limiting value or a sequence of allowed values to be used by said network element.

12. An apparatus according to claim 8, wherein said at least one control parameter is comprised in at least one information element and is inserted into a control message by adding said information element to a control message of said at least one kind of control message transmitted from said controller to said network element over said interface.

13. An apparatus comprising a component configured to receive control messages from a controller of a communications network via an interface, and configured to extract at least one control parameter from at least one kind of received messages into which at least one control parameter was inserted by said controller to enable a network element to configure at least one communication channel between the network element and a user device, said at least one control parameter comprises at least one of:

sets of a modulation and coding schemes from which said network element can choose every transmission time interval for high speed downlink packet access transmissions;

the number of code channels which will be assigned to high speed downlink shared channels used by said network element;

an indication of a transmission time interval length to be used by said network element; and one or more parameters to be used by said network element to configure a hybrid automatic repeat request implemented in said network element.

14. An apparatus according to claim 13, wherein said apparatus is said network element, and wherein said network element is a Node B of a universal mobile telecommunication services terrestrial radio access network.

15. An apparatus according to claim 13, wherein the content of said at least one control parameter is a fixed value, a limiting value or a sequence of allowed values to be used by said network element.

16. An apparatus according to claim 13, wherein said at least one control parameter is comprised in at least one information element and is inserted into a control message by adding said information element to a control message of said at least one kind of control message transmitted from said controller to said network element over said interface.

17. A method comprising:

inserting, via a processor, at least one control parameter into at least one kind of control message; and transmitting said control message from a controller of a communications network over an interface to a network element to enable the network element to configure at least one communication channel between the network element and a user device, said at least one control parameter comprises at least one of:

sets of a modulation and coding schemes from which said network element can choose every transmission time interval for high speed downlink packet access transmissions;

the number of code channels which will be assigned to high speed downlink shared channels used by said network element;

an indication of a transmission time interval length to be used by said network element; and one or more parameters to be used by said network element to configure a hybrid automatic repeat request implemented in said network element.

18. A method-according to claim 17, wherein said communications network is a universal mobile telecommunication services terrestrial radio access network, wherein said network element is a Node B, wherein said controller is a radio network controller and wherein said interface is an Iub interface.

19. A method according to claim 17, wherein the content of said at least one control parameter is a fixed value, a limiting value or a sequence of allowed values to be used by said network element.

20. A method according to claim 17, wherein said at least one control parameter is comprised in at least one information element and is inserted into a control message by adding said information element to a control message of said at least one kind of control message transmitted from said controller to said network element over said interface.

21. A method according to claim 17, wherein said at least one control parameter comprises in addition a power level to be used by said network element for high speed downlink shared channels in high speed downlink packet access.

22. A method according to claim 17, wherein said one or more parameters to be used by said network element to configure hybrid automatic repeat request includes at least one of the number of channels to be used for hybrid automatic repeat request, the maximum number of attempts for hybrid automatic repeat request, and restrictions of redundancy versions from which said network element can choose.

23. A method according to claim 17, wherein said at least one kind of control message is a CELL SETUP REQUEST message and/or a CELL RECONFIGURATION REQUEST message.

* * * * *